United States Patent
Ishizaki et al.

(10) Patent No.: US 8,271,587 B2
(45) Date of Patent: Sep. 18, 2012

(54) OBJECT MOVEMENT CONTROL SYSTEM, OBJECT MOVEMENT CONTROL METHOD, SERVER AND COMPUTER PROGRAM

(75) Inventors: Kazuaki Ishizaki, Tokyo (JP); Shuichi Shimizu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 12/407,801

(22) Filed: Mar. 20, 2009

(65) Prior Publication Data

US 2009/0241034 A1    Sep. 24, 2009

(30) Foreign Application Priority Data

Mar. 21, 2008 (JP) .................................. 2008-74686

(51) Int. Cl.
    *G06F 15/16* (2006.01)
(52) U.S. Cl. ......... 709/205; 709/201; 709/213; 709/248
(58) Field of Classification Search .................. 709/201, 709/205, 213, 248
    See application file for complete search history.

(56) References Cited

U.S. PATENT DOCUMENTS

| | | | | |
|---|---|---|---|---|
| 5,712,964 A * | 1/1998 | Kamada et al. | ................ | 345/418 |
| 5,779,548 A * | 7/1998 | Asai et al. | ........................ | 463/31 |
| 5,947,819 A * | 9/1999 | Ohshima | ........................... | 463/2 |
| 6,162,174 A * | 12/2000 | Friemel | .......................... | 600/447 |
| 6,231,443 B1 * | 5/2001 | Asai et al. | ........................ | 463/32 |
| 6,898,759 B1 * | 5/2005 | Terada et al. | .................. | 715/202 |
| 7,129,951 B2 * | 10/2006 | Stelly, III | ........................ | 345/474 |
| 8,095,237 B2 * | 1/2012 | Habibi et al. | .................. | 700/245 |
| 2002/0138607 A1 * | 9/2002 | O'Rourke et al. | ............ | 709/224 |
| 2003/0212732 A1 * | 11/2003 | Edahiro et al. | ................ | 709/106 |
| 2005/0264576 A1 * | 12/2005 | Sommers | ....................... | 345/543 |
| 2007/0276901 A1 * | 11/2007 | Glinsky et al. | ................ | 709/203 |
| 2007/0282941 A1 * | 12/2007 | Takakura et al. | ............. | 709/202 |
| 2008/0030458 A1 * | 2/2008 | Helbing et al. | ................ | 345/156 |
| 2008/0316324 A1 * | 12/2008 | Rofougaran et al. | ...... | 348/222.1 |
| 2009/0119396 A1 * | 5/2009 | Kanda | ............................ | 709/223 |
| 2009/0241034 A1 * | 9/2009 | Ishizaki et al. | ................ | 715/753 |
| 2010/0174421 A1 * | 7/2010 | Tsai et al. | ........................ | 700/302 |
| 2011/0019205 A1 * | 1/2011 | Gerber et al. | ................. | 356/615 |
| 2011/0059792 A1 * | 3/2011 | Fujisawa | ......................... | 463/30 |

FOREIGN PATENT DOCUMENTS

| | | |
|---|---|---|
| JP | 11039472 | 2/1999 |
| JP | 2002-175288 | 6/2002 |

* cited by examiner

*Primary Examiner* — Michael Won
(74) *Attorney, Agent, or Firm* — Vazken Alexanian

(57) ABSTRACT

An object movement control system, an object movement control method, a server, and a computer program that can update the positional information of an object in a virtual space at high speed by appropriately distributing processing loads. Client control units obtain information about the position of a first object in a virtual space and information about movement of the first object and detect other objects that exist in a virtual region that contains the first object, which has been moved. The distances between objects that exist in a virtual region are calculated, and only when the number of objects the distances to which are shorter than a predetermined threshold exceeds a predetermined number, information about the objects is sent to a server. The server assigns a collision determination client that performs collision determination to each pair of objects selected from the objects.

14 Claims, 17 Drawing Sheets

FIG. 3

| REGION ID | OBJECT ID | CLIENT CONTROL UNIT ID | X COORDINATE | Y COORDINATE | ⋮ |
|---|---|---|---|---|---|
| R1 | X1 | P1 | XXX | XXX | XXXX |
| | X2 | P2 | XXX | XXX | XXX |
| | X3 | P3 | XXX | XXX | |
| | X4 | P4 | XXX | XXX | |
| R2 | X5 | P5 | XXX | XXX | |
| ⋯ | ⋯ | ⋯ | ⋯ | ⋯ | ⋯ |

FIG. 14
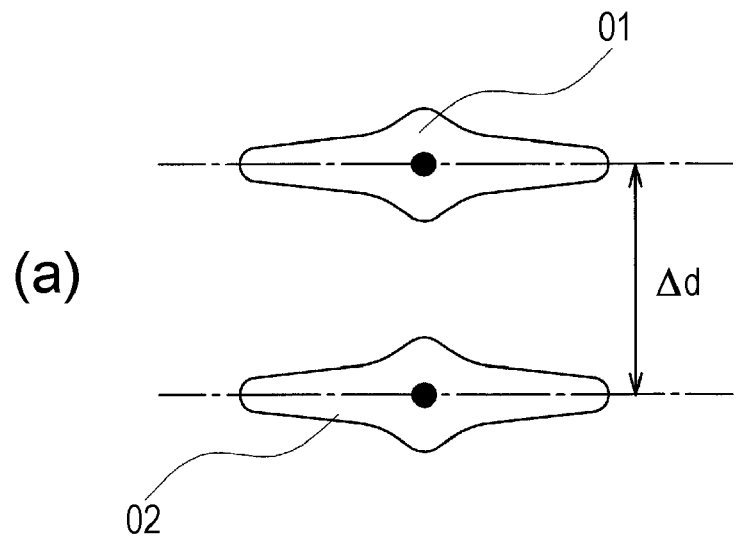
(a)
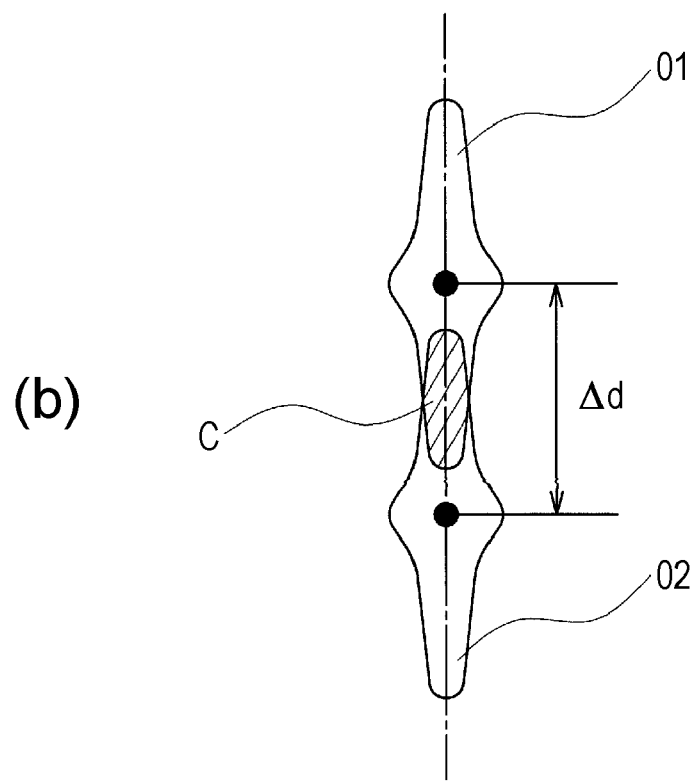
(b)

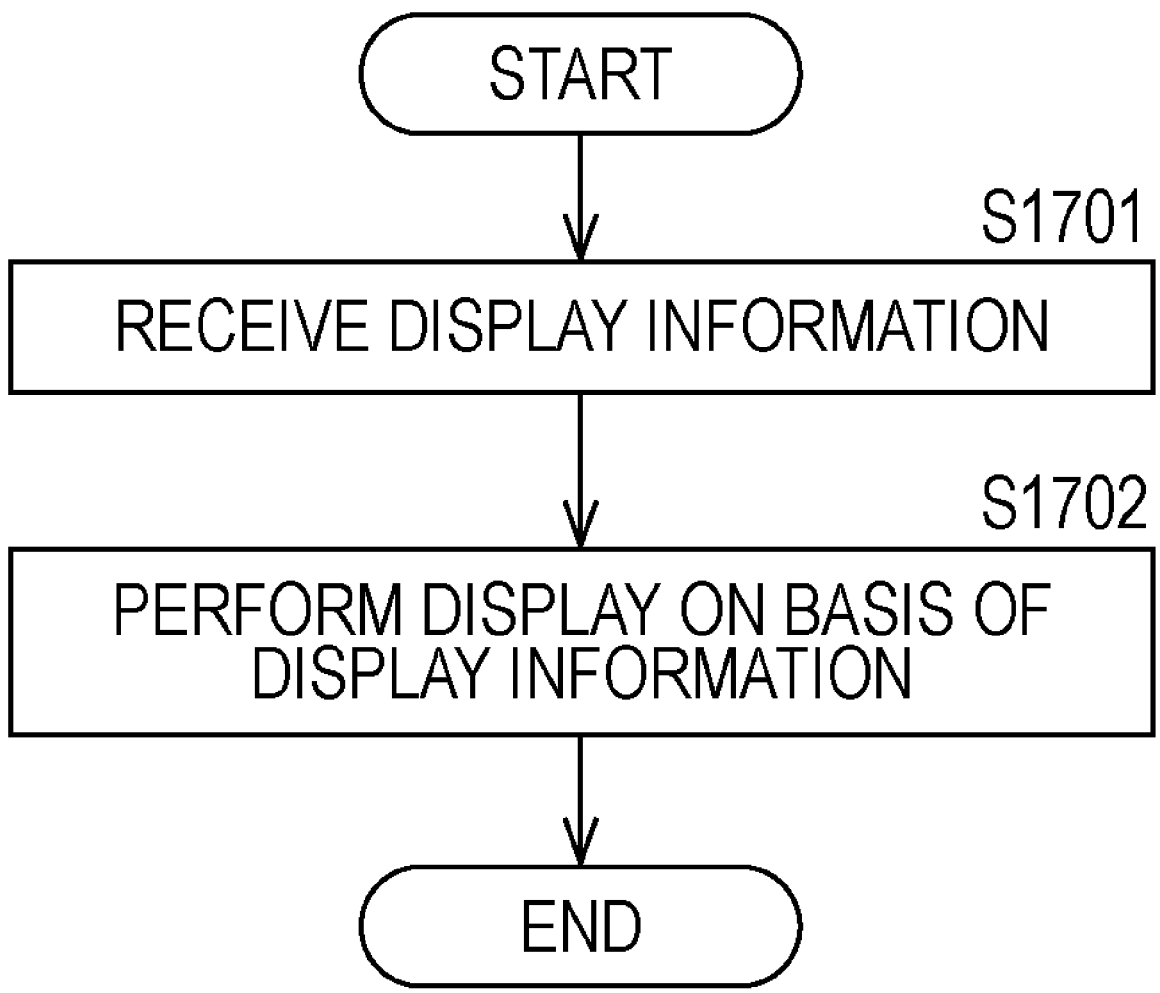

OBJECT MOVEMENT CONTROL SYSTEM, OBJECT MOVEMENT CONTROL METHOD, SERVER AND COMPUTER PROGRAM

CROSS REFERENCE TO RELATED APPLICATION

This application claims priority under 35 U.S.C. §119 from Japanese Patent Application No. 2008-74686 filed Mar. 21, 2008, the entire contents of which are incorporated herein by reference.

BACKGROUND OF THE INVENTION

1. Field of the Invention

The present invention relates to an object movement control system, an object movement control method, a server, and a computer program that can smoothly update the positional information of a virtual object in a virtual space by distributing processing loads.

2. Description of the Related Art

Recently, as computer technology has rapidly developed, the amount of data that can be processed by each processor has rapidly increased. However, in recent years as information processing techniques have been applied to all industries, the demand for data processing capabilities has greatly exceeded the rate of improvement in processor capabilities. Thus, under current circumstances, in many cases, a single processor cannot provide sufficient processing capability.

Accordingly, in many cases, data processing capability is improved by parallel processing using a plurality of processors. In particular, in a virtual space system that calculates and displays the movement, state, and the like of a virtual object such as a virtual avatar in a virtual space identified by software, a problem exists in that unless parallel processing using a plurality of processors is performed, the responsiveness of the movement of a virtual object is unsatisfactory, such that virtual reality is impaired.

In order to solve such a problem, for example, Japanese Unexamined Patent Application Publication No. 2002-175288 discloses a multiprocessor system that includes a plurality of cell processors and can perform parallel processing at high speed. In Japanese Unexamined Patent Application Publication No. 2002-175288, data is broadcasted to all cell processors, and each of the cell processors selects data necessary for processing and performs predetermined processing. Then, a CPU core obtains the results of the processing from all the cell processors to perform, at high speed, data processing that causes heavy processing loads. In particular, paragraphs (0054) to (0057) of the document disclose a case where the multiprocessor system is applied to determination of collision of virtual objects.

However, in the multiprocessor system disclosed in Japanese Unexamined Patent Application Publication No. 2002-175288, since data necessary for a series of processing steps is broadcast simultaneously to all cell processors connected to the multiprocessor system so that data communication can be performed, processing loads on the network increase. Thus, a problem exists in that the rate of improvement in the overall processing throughput decreases.

Moreover, in the determination of collision of virtual objects disclosed in paragraphs (0054) to (0057) of the document, since each of the cell processors performs the collision determination, which causes heavy processing loads, processing that is concurrently performed in each of the cell processors, other than the collision determination, may be affected. The other processing may include position calculation or generation of display image data.

Moreover, since processing loads on each of the cell processors change over time, a method for uniformly assigning processing to be performed may cause uneven distribution of processing loads. Thus, the method may cause a bottleneck in the improvement of overall throughput.

In view of such circumstances, it is an object of the present invention to provide an object movement control system, an object movement control method, a server, and a computer program that can update the positional information of an object in a virtual space at high speed by appropriately distributing processing loads.

SUMMARY OF THE INVENTION

The present invention provides an object movement control system comprising:

a server for obtaining and storing positions of a plurality of objects in a virtual space that comprises a plurality of virtual regions, and a plurality of client control units connected to the server so that the client control units can communicate data with the server and control a movement position of a predetermined object for each object.

The present invention further provides an object movement control method performed by a server and a plurality of client control units connected to the server, the method comprising:

obtaining and storing positions of a plurality of objects in a virtual space that comprises a plurality of virtual regions, and controlling a motion of an object that is moved in the virtual space.

The present invention still further provides an article of manufacture tangibly embodying a computer readable program that can be executed in a server that is connected to a plurality of client control units that control a movement position of a predetermined object for each object and a plurality of collision determination clients that determine collision between predetermined objects in a virtual region, wherein the computer program, when executed, causes the server to carry out the steps of the above method.

BRIEF DESCRIPTION OF THE DRAWINGS

FIG. 3 illustrates the data structure of an object status information storage unit.

FIG. 14 illustrates the relationship between the positions of objects in a case where objects are pieces of three-dimensional polygon data that have a human shape.

FIG. 17 is a flowchart showing the procedure for displaying an object by the CPU in one of the clients in the object movement control system according to the embodiment of the present invention.

DETAILED DESCRIPTION OF THE PREFERRED EMBODIMENT

Figure 1:
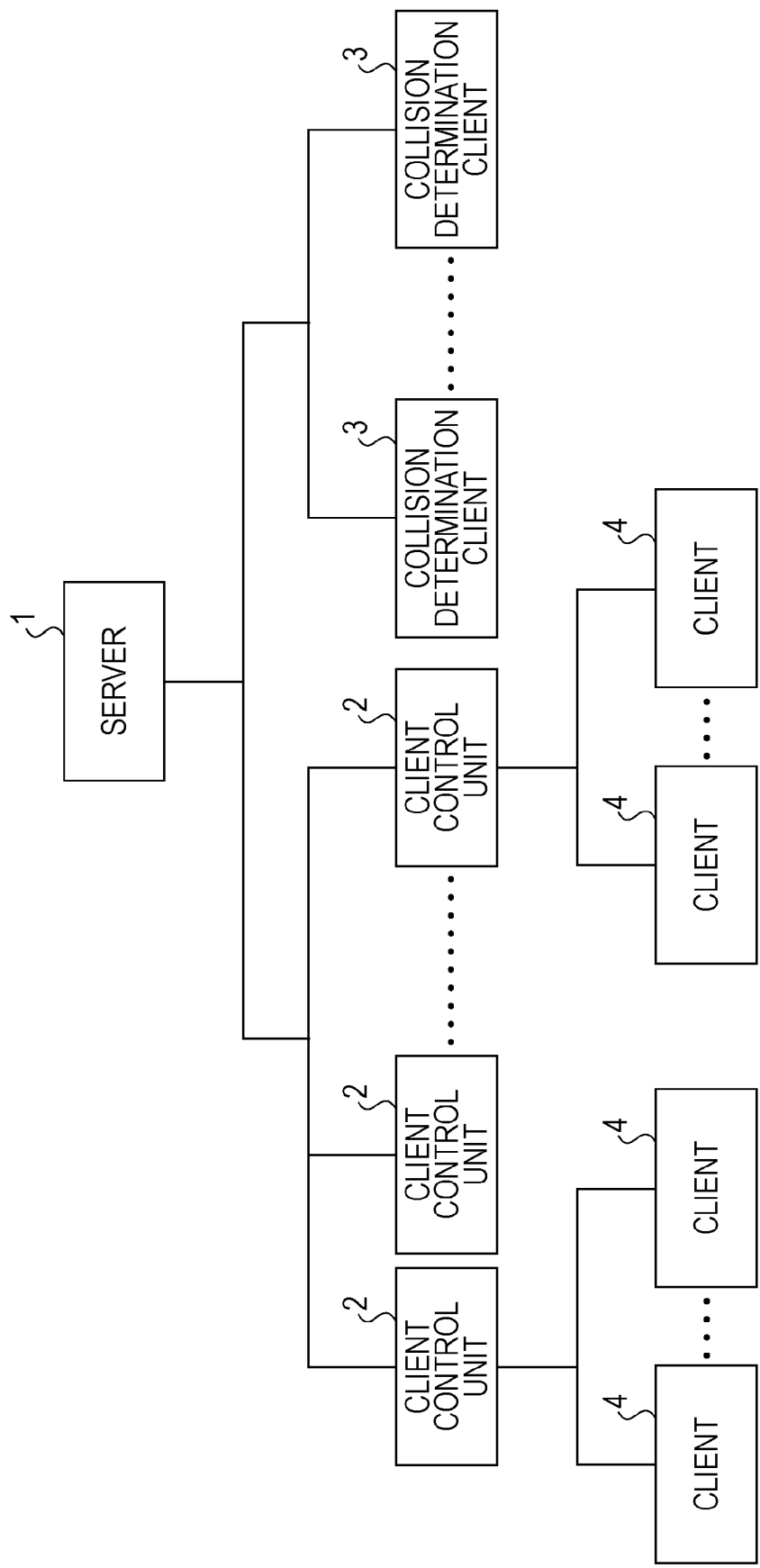
FIG. 1 is a block diagram showing the components of an object movement control system according to an embodiment of the present invention.

To achieve the aforementioned object, an object movement control system according to a first aspect of the present invention includes a server that obtains and stores positions of a plurality of objects in a virtual space that includes a plurality of virtual regions, and a plurality of client control units that are connected to the server so that the client control units can communicate data with the server and control a movement position of a predetermined object for each object. The object movement control system controls a motion of an object that is moved in the virtual space.

The object movement control system includes a plurality of collision determination clients that are connected to the server so that the collision determination clients can communicate data with the server and determine collisions between predetermined objects in a virtual region. Each of the client control units include movement position obtaining means for obtaining information about a position of a first object in a virtual space and information about the movement of the first object. Each client control unit may further include object detecting means for detecting, on the basis of the obtained information about the position and information about the movement, other objects that exist in a virtual region that contains the first object, which has been moved, distance calculating means for calculating distances between the first object and the detected other objects, distance determining unit for determining whether the calculated distances are smaller than a predetermined threshold, neighboring-object-number calculating means for calculating the total number of objects distances to which are determined as being shorter than the predetermined threshold by the distance determining unit, determining means for determining whether the calculated total number of objects exceeds a predetermined number, and object information sending means for sending, to the server, information about the objects, which exist in the virtual region, when the determining means determines that the calculated total number of objects exceeds the predetermined number. The server includes object information receiving means for receiving the information about the objects, which exist in the virtual region, and assigning means for assigning one of the collision determination clients that performs collision determination to each pair of objects selected from the received objects.

Moreover, in the first embodiment of the invention, the server may include load value obtaining means for obtaining an index value that indicates a processing load on each of the collision determination clients. In a second embodiment of the invention, the assigning means may determine one of the collision determination clients to which a pair of objects is assigned on the basis of the obtained index values.

Moreover, in a third embodiment of the invention, the distance calculating means may also calculate distances between representative points that indicate positions of respective objects.

To achieve the aforementioned object, an object movement control method according to a fourth embodiment of the invention can be performed in a server that obtains and stores positions of a plurality of objects in a virtual space that includes a plurality of virtual regions, and a plurality of client control units that are connected to the server so that the client control units can communicate data with the server and control a movement position of a predetermined object for each object. The method controls a motion of an object that is moved in the virtual space. A plurality of collision determination clients that determine collision between predetermined objects in a virtual region are connected to the server so that the collision determination clients can communicate data with the server. Each of the client control units obtains information about the position and movement of a first object in a virtual space and detects, on the basis of the obtained information about the position and information about the movement, other objects that exist in a virtual region that contains the first object which has been moved. The client control unit then calculates distances between the first object and the detected other objects, determines whether the calculated distances are smaller than a predetermined threshold, calculates the total number of objects distances which are determined as being shorter than the predetermined threshold, determines whether the calculated total number of objects exceeds a predetermined number, and sends, to the server, information about the objects, which exist in the virtual region, when it is determined that the calculated total number of objects exceeds the predetermined number. The server receives the information about the objects, which exist in the virtual region, and assigns one of the collision determination clients that performs collision determination to each pair of objects selected from the received objects.

To achieve the aforementioned object, a server according to a fifth embodiment of the invention is connected to a plurality of client control units that control a movement position of a predetermined object for each object and a plurality of collision determination clients that determine collision between predetermined objects in a virtual region so that data communication can be performed and obtains and stores positions of a plurality of objects in a virtual space that includes a plurality of virtual regions. The server includes object information receiving means for receiving, from the client control units, information about a plurality of objects that exist in the virtual region, and assigning means for assigning one of the collision determination clients that performs collision determination to each pair of objects selected from the received objects.

Moreover, in the fifth embodiment of the invention, load value obtaining means for obtaining an index value that indicates a processing load on each of the collision determination clients may be provided.

In a sixth embodiment of the invention, the assigning means may determine one of the collision determination clients to which a pair of objects is assigned on the basis of the obtained index.

To achieve the aforementioned object, a computer program according to a seventh embodiment of the invention can be executed in a server that is connected to a plurality of client control units that control a movement position of a predetermined object for each object and a plurality of collision determination clients that determine collision between predetermined objects in a virtual region so that data communication can be performed. The computer program can obtain and store positions of a plurality of objects in a virtual space that includes a plurality of virtual regions. The computer program causes the server to function as an object information receiving means for receiving, from the client control units, information about a plurality of objects that exist in the virtual region, and as an assigning means for assigning one of the collision determination clients that performs collision determination to each pair of objects selected from the received objects.

Moreover, in the seventh embodiment of the invention, the server may be caused to function as load value obtaining means for obtaining an index value that indicates a processing load on each of the collision determination clients.

In an eight embodiment of the invention, assigning means may be caused to function as means for determining one of the collision determination clients to which a pair of objects is assigned on the basis of the obtained index values.

In the first, fourth, and seventh embodiments of the invention, the plurality of collision determination clients, which are connected to the server so that the collision determination clients can communicate data with the server and determine collision between the predetermined objects in the virtual region, are provided separately. Each of the plurality of client control units, which are connected to the server so that the client control units can communicate data with the server, obtains the information about the position of the first object in the virtual space and the information about the movement of the first object, and detects, on the basis of the obtained information about the position and information about the movement, the other objects existing in the virtual region containing the first object, which has been moved. The distances between the first object and the detected other objects are calculated, and then it is determined whether the calculated distances are smaller than the predetermined threshold. The total number of objects, distances to which are determined as being shorter than the predetermined threshold, is calculated. When the calculated total number of objects exceeds the predetermined number, the information about the objects, which exist in the virtual region, is sent to the server. Thus, it can be determined whether objects that are likely to collide with each other exist in one virtual region, and overall processing loads can be reduced by determining the probability of collision only for objects that are likely to collide with each other.

Moreover, the server receives the information about the objects, which exist in the virtual region, and assigns one of the collision determination clients that performs collision determination to each pair of objects selected from the received objects. Thus, the collision determination clients dedicated to collision determination are caused to perform collision determination that causes heavy processing loads, so that processing loads on the client control units can be greatly reduced, and the throughput of determination of a movement position by determining the possibility of movement of an object can be improved as a whole.

In this case, a virtual space represents a space that is artificially set in a computer and includes a plurality of virtual regions of a predetermined size. An object can be moved into one virtual region or moved from one virtual region into another virtual region. Unlike the known method, the client control units do not control the positional information of an object that exists in a virtual region but, regarding an object at a position, control the positional information of an object that exists in a virtual region in which the object exists. When an object is moved across virtual regions, in the known method, various types of information exchange are necessary between ones of the client control units that control the virtual regions. In contrast, for each object, control is performed, so that only acquisition of information about objects, other than a certain object, that exist in a virtual region in which the object exists from the server is necessary, and thus network loads can be reduced.

In the second and eighth embodiments of the invention, the server obtains an index value that indicates a processing load on each of the collision determination clients, and one of the collision determination clients to which a pair of objects is assigned is determined on the basis of the obtained index values. Thus, a process of determining collision between objects can be assigned to one of the collision determination clients with a relatively small processing load, so that loads on the plurality of collision determination clients can be controlled so as to be substantially even. Accordingly, a decrease in the throughput due to concentration of processing loads on one of the collision determination clients can be prevented, so that the throughput can be stably improved as a whole.

In this case, an index value that indicates a processing load means an index value that indicates the degree of a processing load on a computer, for example, a value that indicates a normalized load among different clients, a system load value managed by an operating system, the number of processes, or the combination of these values.

In the third embodiment of the invention, the degree of concentration of objects that exist in one virtual region can be readily evaluated by calculating distances between representative points that indicate the positions of respective objects. Thus, pairs of objects for which collision determination needs to be performed can be determined without increasing processing loads.

In the fifth embodiment of the invention, the information about the plurality of objects, which exist in the virtual region, is received from the client control units, and one of the collision determination clients that performs collision determination is assigned to each pair of objects selected from the received objects. Information about a plurality of objects that exist in a virtual region for which the client control units determine that collision determination is necessary is obtained and transferred to the collision determination clients, which are separately provided, and the probability of collision is determined only for objects that exist in a virtual region in which collision is likely to occur, so that overall processing loads can be reduced.

Moreover, the separate collision determination clients dedicated to collision determination are caused to perform collision determination that causes heavy processing loads, so that processing loads on the client control units can be greatly reduced, and the throughput of determination of a movement position by determining the possibility of movement of an object can be improved as a whole.

In the sixth embodiment of the invention, an index value that indicates a processing load on each of the collision determination clients is obtained, and one of the collision determination clients to which a pair of objects is assigned is determined on the basis of the obtained index values. Thus, a process of determining collision between objects can be assigned to one of the collision determination clients with a relatively small processing load more times, so that loads on the plurality of collision determination clients can be controlled so as to be substantially even. Accordingly, a decrease in the throughput due to concentration of processing loads on one of the collision determination clients can be prevented, so that the throughput can be stably improved as a whole.

According to the present invention, only when the total number of objects the distances to which are determined as being shorter than a predetermined threshold exceeds a predetermined number, is it determined that collision between objects is likely to occur, and the collision determination clients, which are separately provided, determine the probability of collision so that overall processing loads can be reduced and the throughput of calculation of the movement position of an object in a virtual space can be improved.

Moreover, when an object is moved across virtual regions, in the known method, various types of information exchange are necessary between ones of the client control units that control the virtual regions. In contrast, for each object, control is performed, so that only acquisition of information about objects, other than a certain object, that exist in a virtual region in which the object exists from the server is necessary, and thus network loads can be reduced.

An object movement control system according to an embodiment of the present invention will now be described specifically on the basis of the drawings.

FIG. 1 is a block diagram showing the components of the object movement control system according to an embodiment of the present invention. The object movement control system according to the embodiment of the present invention includes clients 4 each of which outputs and displays an image corresponding to a virtual space, a plurality of client control units 2 each of which sends and receives, for example, instruction information about a specific object to and from multiple ones of the clients 4, collision determination clients 3 each of which determines whether a predetermined combination of objects collide with each other at a movement position in a virtual space, and a server 1.

A virtual space represents a space to which three-dimensional coordinates are virtually assigned. Thus, the position of a virtual object of a predetermined size in the space can be determined using, for example, the three-dimensional coordinates of the virtual object in the space and the polygon data. In the embodiment of the present invention, the position of each object in a virtual space can be displayed in the clients 4, and an instruction to move each object is input from the clients 4.

Figure 2:
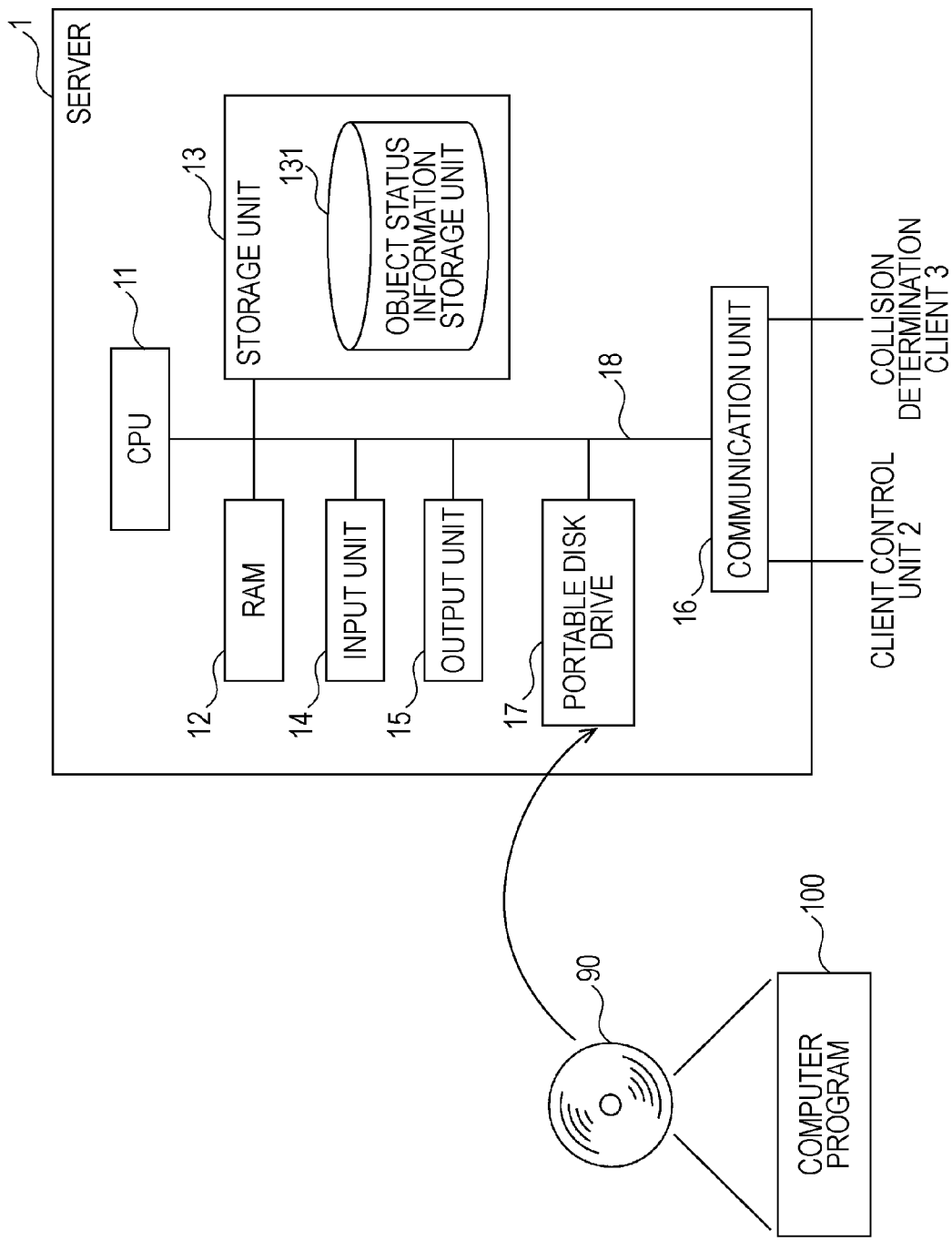
FIG. 2 is a block diagram showing a hardware configuration in a case where a server in the object movement control system according to the embodiment of the present invention is implemented using a CPU.

FIG. 2 is a block diagram showing a hardware configuration in a case where the server 1 in the object movement control system according to the embodiment of the present invention is implemented using a CPU 11. In FIG. 2, the server 1 according to the embodiment includes at least the central processing unit (CPU) 11, a RAM 12, a storage unit 13, an input unit 14, an output unit 15, a communication unit 16, a portable disk drive 17, and an internal bus 18 that connects the aforementioned hardware components to each other.

The CPU 11 is connected to the aforementioned hardware components of the server 1 via the internal bus 18. The CPU 11 controls the operations of the aforementioned hardware components and performs various software functions according to a computer program 100 stored in the storage unit 13. The RAM 12 includes a volatile memory such as an SRAM or an SDRAM. A load module is loaded into the RAM 12 when executing the computer program 100, and the RAM 12 stores, for example, temporary data generated when executing the computer program 100.

The storage unit 13 includes a built-in fixed storage unit (a hard disk), a ROM, and the like. The computer program 100 stored in the storage unit 13 is downloaded via the portable disk drive 17 from a portable recording medium 90, such as a DVD or a CD-ROM, in which information, for example, programs and data, is recorded. When the computer program 100 is executed, the computer program 100 is loaded from the storage unit 13 into the RAM 12 and then executed. Needless to say, the computer program 100 may be a computer program that is downloaded via the communication unit 16 from an external computer.

Moreover, the storage unit 13 includes an object status information storage unit 131 that stores identification information for identifying individual regions into which a virtual space is divided and identification information for identifying objects that exist in the individual regions. Moreover, the object status information storage unit 131 stores, for example, identification information for identifying the client control units 2, which control the movement of individual objects, and the coordinates of the positions of the individual objects on a virtual two-dimensional plane.

FIG. 3 illustrates the data structure of the object status information storage unit 131. The object status information storage unit 131 stores at least region IDs that are identification information for identifying a plurality of regions, object IDs that are identification information for identifying objects that exist in the individual regions, client control unit IDs that are identification information for identifying the client control units 2, which control the movement of individual objects, and the X and Y coordinates of each object in a corresponding region, as shown in FIG. 3. In this arrangement, when a plurality of neighboring objects are detected, it can be readily determined from which of the client control units 2 detailed information necessary to perform collision determination should be obtained.

The communication unit 16 is connected to the internal bus 18. The communication unit 16 can send and receive data to and from external computers, for example, the client control units 2 and the collision determination clients 3, by being connected to external networks such as the Internet, a LAN, and a WAN.

The input unit 14 is a data input medium such as a keyboard and a mouse. The output unit 15 is, for example, a display unit such as a CRT monitor or an LCD or a printer such as a laser printer or a dot printer.

Figure 4:
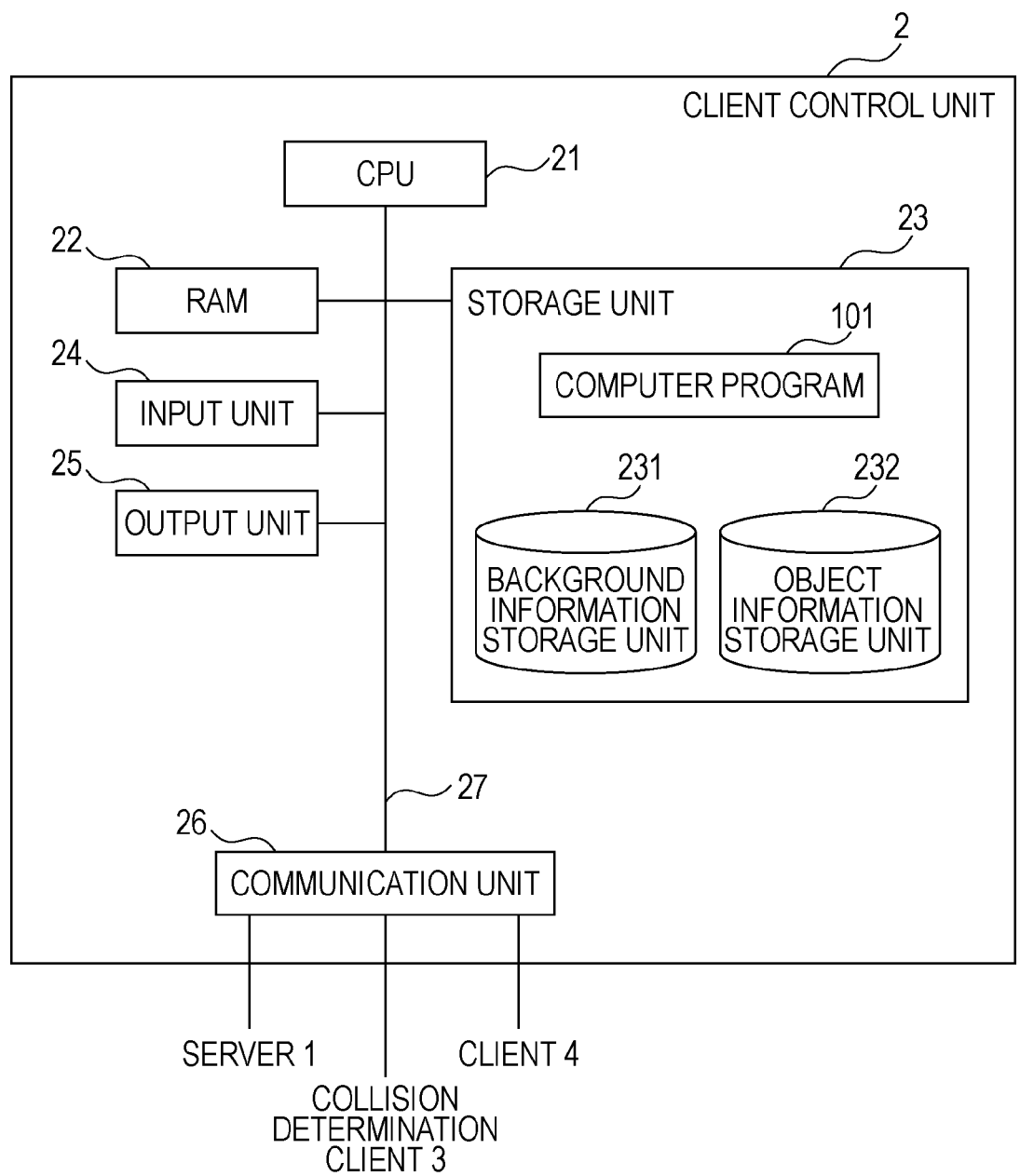
FIG. 4 is a block diagram showing a hardware configuration in a case where each client control unit in the object movement control system according to the embodiment of the present invention is implemented using a CPU.

FIG. 4 is a block diagram showing a hardware configuration in a case where each of the client control units 2 in the object movement control system according to the embodiment of the present invention is implemented using a CPU 21. In FIG. 4, each of the client control units 2 according to the embodiment includes at least the central processing unit (CPU) 21, a RAM 22, a storage unit 23, an input unit 24, an output unit 25, a communication unit 26, and an internal bus 27 that connects the aforementioned hardware components to each other.

The CPU 21 is connected to the aforementioned hardware components of each of the client control units 2 via the internal bus 27. The CPU 21 controls the operations of the aforementioned hardware components and performs various software functions according to a computer program 101 stored in the storage unit 23. The RAM 22 includes a volatile memory such as an SRAM or an SDRAM. A load module is loaded into the RAM 22 when executing the computer program 101, and the RAM 22 stores, for example, temporary data generated when executing the computer program 101.

The storage unit 23 includes a built-in fixed storage unit (a hard disk), a ROM, and the like. When the computer program 101 stored in the storage unit 23 is executed, the computer program 101 is loaded from the storage unit 23 into the RAM 22 and then executed. The computer program 101 may be downloaded via a separate portable disk drive (not shown) from a portable recording medium such as a DVD or a CD-ROM or via the communication unit 26 from an external computer.

Moreover, the storage unit 23 includes a background information storage unit 231 that stores background information about the shapes, positions, and the like of objects that are not moved, such as buildings and roads, other than objects the movement of which is controlled. The storage unit 23 further includes an object information storage unit 232 that stores, in association with identification information for identifying objects the movement of which is controlled, information about the shapes, positions, and the like of the objects. In both cases, information about shapes is stored as three-dimensional polygon data, and information about positions is stored as the coordinates of representative points, such as the barycenters of objects, on a two-dimensional plane.

The communication unit 26 is connected to the internal bus 27. The communication unit 26 can send and receive data to and from external computers, for example, the server 1, the collision determination clients 3, and the clients 4, by being connected to external networks such as the Internet, a LAN, and a WAN.

The input unit 24 is a data input medium such as a keyboard and a mouse. The output unit 25 is, for example, a display unit such as a CRT monitor or an LCD or a printer such as a laser printer or a dot printer.

Figure 5:
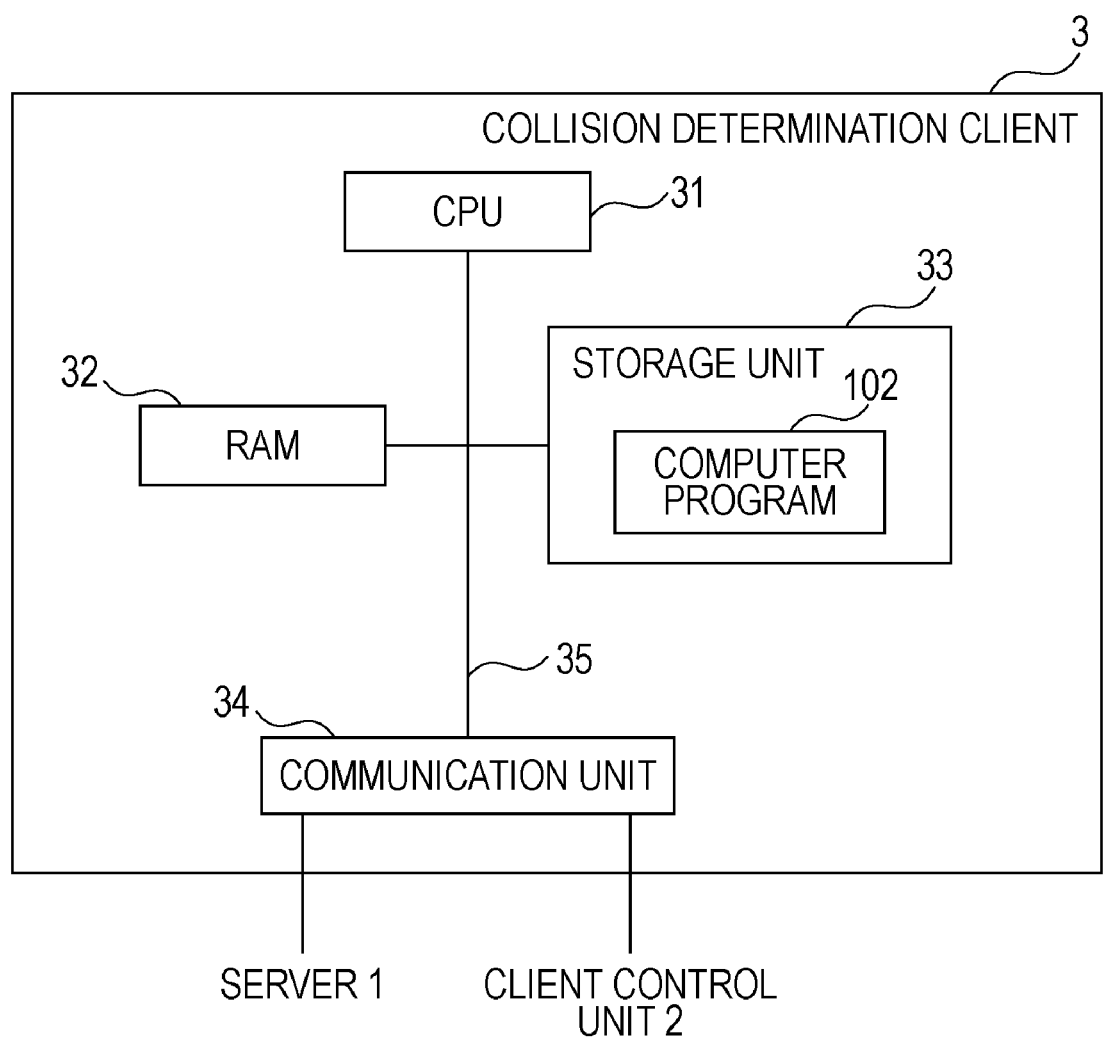
FIG. 5 is a block diagram showing a hardware configuration in a case where each collision determination client in the object movement control system according to the embodiment of the present invention is implemented using a CPU.

FIG. 5 is a block diagram showing a hardware configuration in a case where each of the collision determination clients 3 in the object movement control system according to the embodiment of the present invention is implemented using a CPU 31. In FIG. 5, each of the collision determination clients 3 according to the embodiment includes at least the central processing unit (CPU) 31, a RAM 32, a storage unit 33, a communication unit 34, and an internal bus 35 that connects the aforementioned hardware components to each other.

The CPU 31 is connected to the aforementioned hardware components of each of the collision determination clients 3 via the internal bus 35. The CPU 31 controls the operations of the aforementioned hardware components and performs various software functions according to a computer program 102 stored in the storage unit 33. The RAM 32 includes a volatile memory such as an SRAM or an SDRAM. A load module is loaded into the RAM 32 when executing the computer program 102, and the RAM 32 stores, for example, temporary data generated when executing the computer program 102.

The storage unit 33 includes a built-in fixed storage unit (a hard disk), a ROM, and the like. When the computer program 102 stored in the storage unit 33 is executed, the computer program 102 is loaded from the storage unit 33 into the RAM 32 and then executed. The computer program 102 may be downloaded via a separate portable disk drive (not shown) from a portable recording medium such as a DVD or a CD-ROM or via the communication unit 34 from an external computer.

The communication unit 34 is connected to the internal bus 35. The communication unit 34 can send and receive data to and from external computers, for example, the server 1 and the client control units 2, by being connected to external networks such as the Internet, a LAN, and a WAN.

Information necessary for collision determination is obtained via the communication unit 34 from one or multiple ones of the client control units 2, which control the movement of objects necessary for the determination according to instruction information from the server 1. Information about the calculated result of the collision determination is sent to the server 1 via the communication unit 34.

Figure 6:
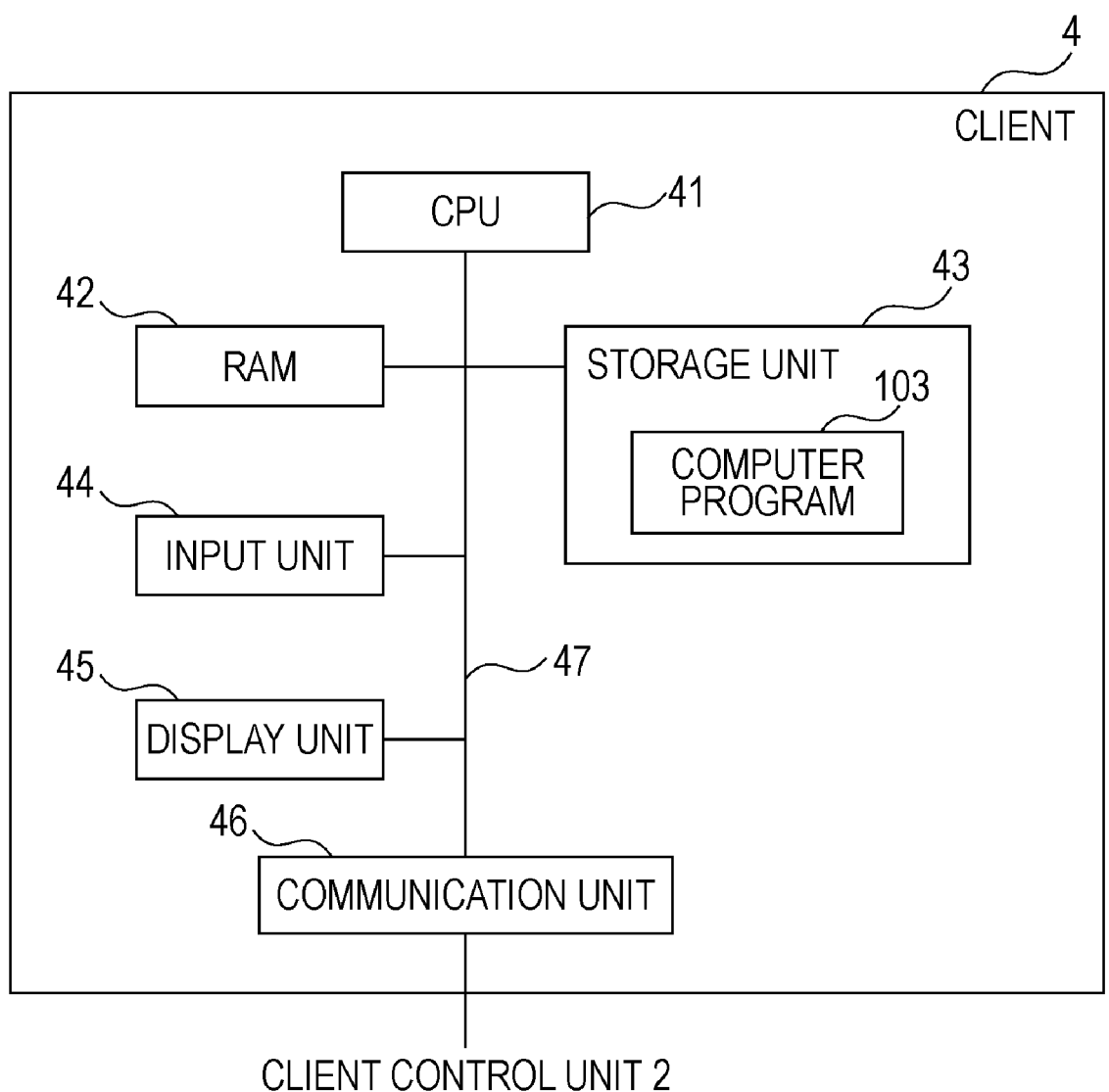
FIG. 6 is a block diagram showing a hardware configuration in a case where each client in the object movement control system according to the embodiment of the present invention is implemented using a CPU.

FIG. 6 is a block diagram showing a hardware configuration in a case where each of the clients 4 in the object movement control system according to the embodiment of the present invention is implemented using a CPU 41. In FIG. 6, each of the clients 4 according to the embodiment includes at least the central processing unit (CPU) 41, a RAM 42, a storage unit 43, an input unit 44, a display unit 45, a communication unit 46, and an internal bus 47 that connects the aforementioned hardware components to each other.

The CPU 41 is connected to the aforementioned hardware components of each of the clients 4 via the internal bus 47. The CPU 41 controls the operations of the aforementioned hardware components and performs various software functions according to a computer program 103 stored in the storage unit 43. The RAM 42 includes a volatile memory such as an SRAM or an SDRAM. A load module is loaded into the RAM 42 when executing the computer program 103, and the RAM 42 stores, for example, temporary data generated when executing the computer program 103.

The storage unit 43 includes a built-in fixed storage unit (a hard disk), a ROM, and the like. When the computer program 103 stored in the storage unit 43 is executed, the computer program 103 is loaded from the storage unit 43 into the RAM 42 and then executed. The computer program 103 may be downloaded via a separate portable disk drive (not shown) from a portable recording medium such as a DVD or a CD-ROM or via the communication unit 46 from an external computer.

The communication unit 46 is connected to the internal bus 47. The communication unit 46 can send and receive data to and from external computers, for example, the client control units 2, by being connected to external networks such as the Internet, a LAN, and a WAN.

The input unit 44 is a data input medium such as a keyboard and a mouse and accepts an entry of, for example, the movement information of an object that is displayed on a screen. The display unit 45 is, for example, a CRT monitor or an LCD and displays, for example, a predetermined object as a three-dimensional image in a virtual space on the basis of the background information and information about the shape, position, and the like of the object that are sent from the client control units 2.

Figure 7:
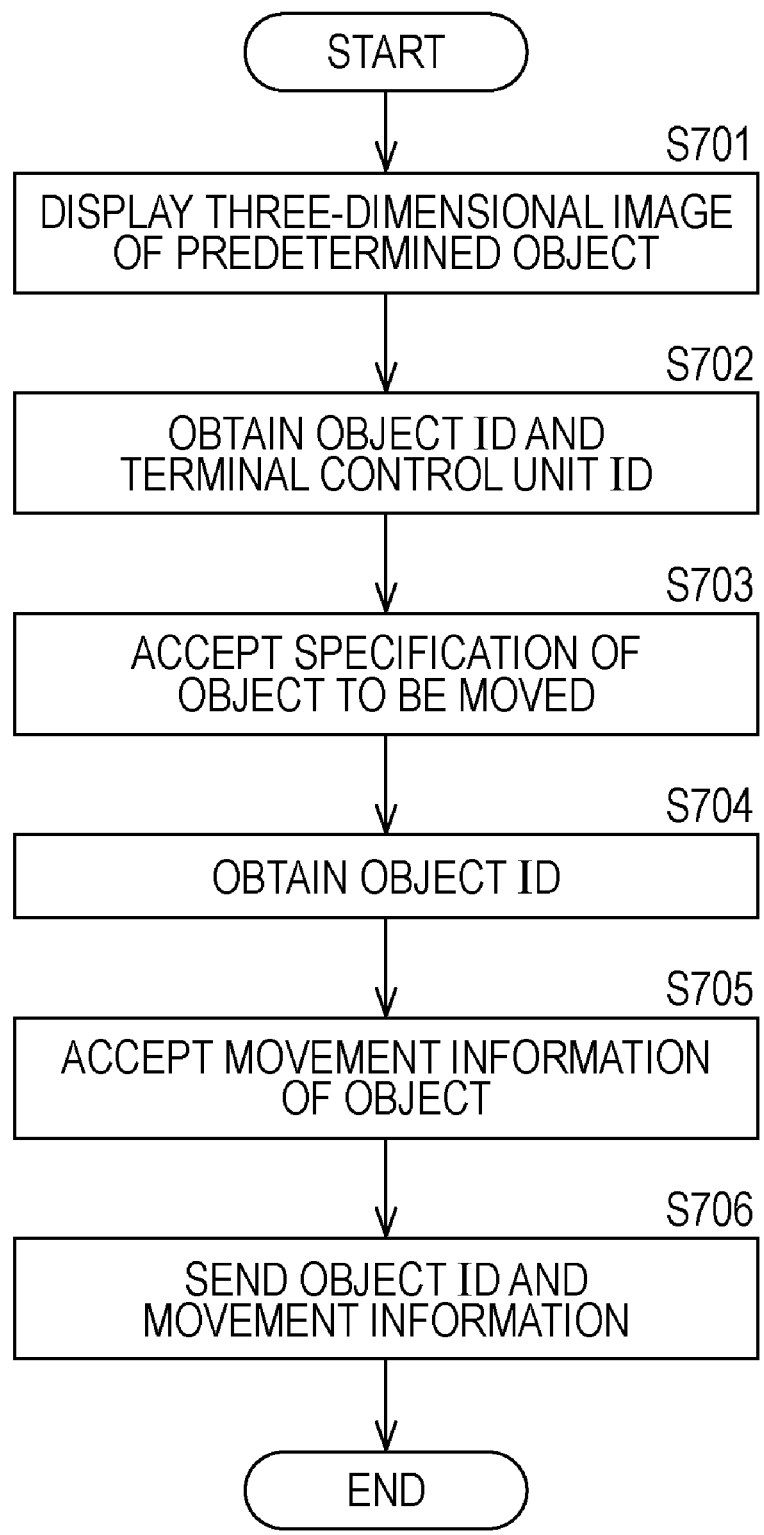
FIG. 7 is a flowchart showing the procedure for receipt of an object movement instruction by a CPU in one of the clients in the object movement control system according to the embodiment of the present invention.

The flow of processing in the object movement control system having the aforementioned configuration will now be described. FIG. 7 is a flowchart showing the procedure for receipt of an object movement instruction by the CPU 41 in one of the clients 4 in the object movement control system according to the embodiment of the present invention.

The CPU 41 in the one of the clients 4 displays a three-dimensional image related to a predetermined object on the display unit 45 on the basis of the background information and information about the shape, position, and the like of the object (step S701). Data to be displayed is obtained from a corresponding one of the client control units 2 via the communication unit 46. The CPU 41 obtains a client control unit ID for identifying the one of the client control units 2, which controls the movement of the object, in association with an object ID for identifying the object to be displayed (step S702).

Figure 8:
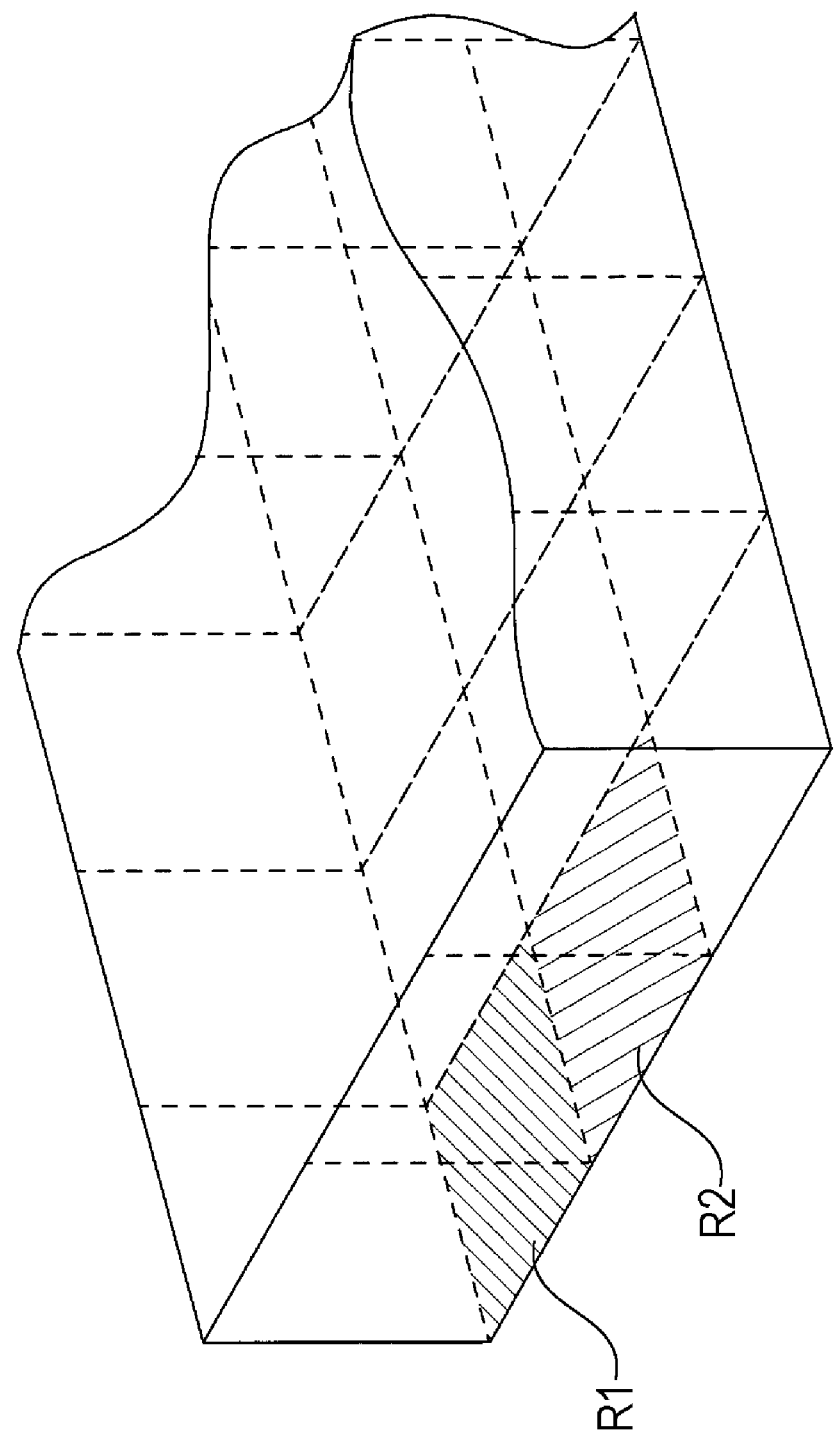
FIG. 8 is an illustration of a virtual space in the object movement control system according to the embodiment of the present invention.

FIG. 8 is an illustration of a virtual space in the object movement control system according to the embodiment. A virtual space is a three-dimensional space and is divided into a plurality of virtual regions using predetermined X and Y coordinates. For the sake of simplicity, a virtual space is divided into virtual regions on an XY plane, and the individual virtual regions are sequentially identified by R1, R2, . . . . An object exists in one of the virtual regions.

The CPU 41 accepts specification of an object to be moved via the input unit 44 (step S703) and obtains an object ID for identifying the object, the specification of which has been accepted (step S704). The CPU 41 accepts input of the movement information of the object, the specification of which has been accepted, for example, information about the movement distance and direction (step S705), and sends the obtained object ID and movement information to one of the client control units 2 with the client control unit ID corresponding to the object ID (step S706). The term "movement information" represents information necessary to move an object, for example, information about the movement direction, movement speed, and movement distance.

Figure 9:
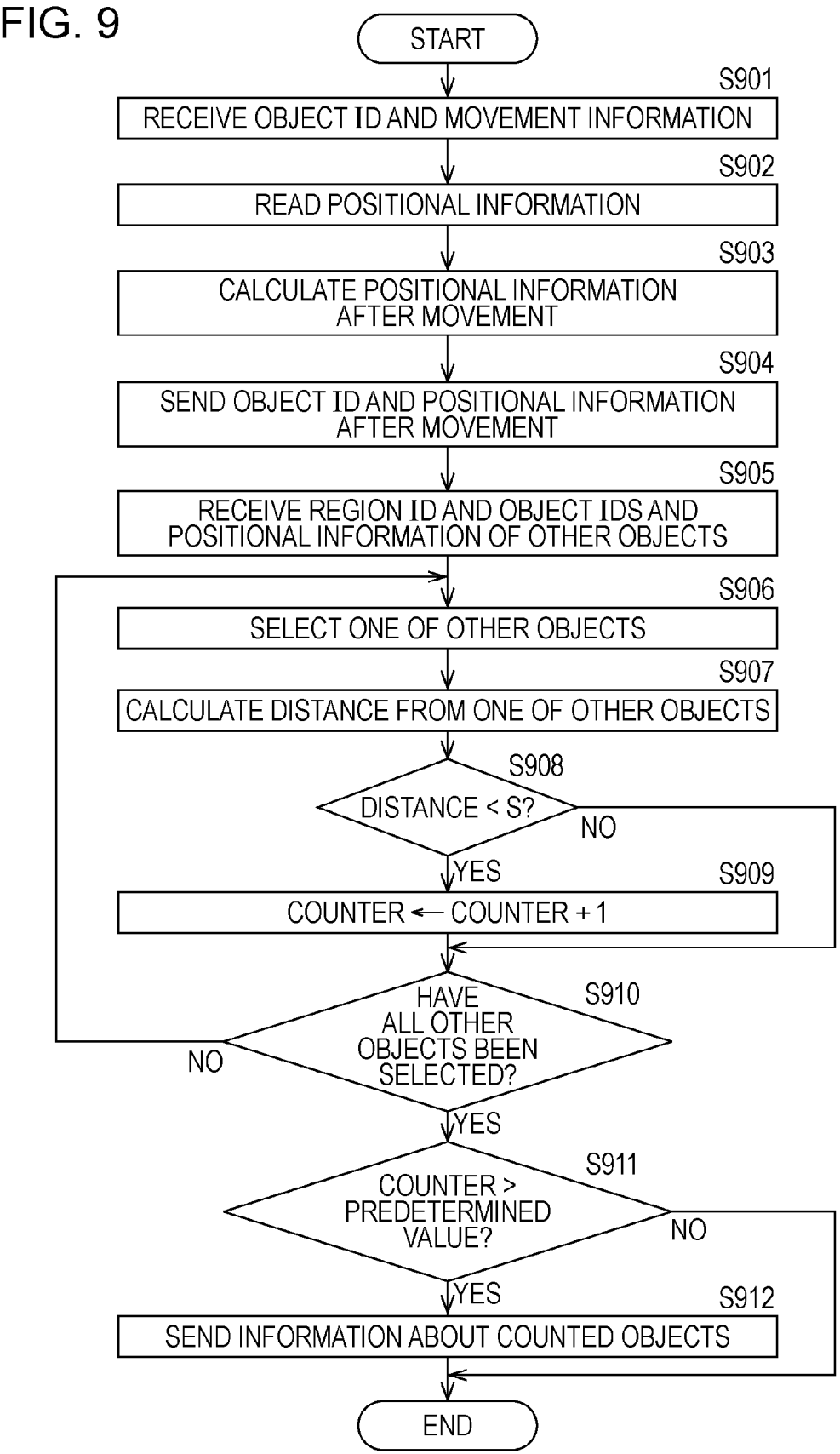
FIG. 9 is a flowchart showing the procedure of processing in a CPU in one of the client control units in the object movement control system according to the embodiment of the present invention.

FIG. 9 is a flowchart showing the procedure of processing in the CPU 21 with a corresponding client control unit 2 in the object movement control system according to the embodiment of the present invention. The CPU 21 receives the object ID for identifying the object, the specification of which by a user has been accepted, and the movement information about the movement from a corresponding client 4 (step S901). In the corresponding client 4, the object, the movement of which is controlled, is displayed. Then, the CPU 21 reads, from the object information storage unit 232 in the storage unit 23, position information about the position of the object corresponding to the received object ID in a virtual space (step S902). The movement information includes, at least, information about the movement direction and speed and the amount of movement. The positional information is information about the three-dimensional coordinates in a virtual region (a virtual space).

The CPU 21 calculates information on a position that the object reaches when the object is moved on the basis of the read positional information and the received movement information (step S903) and sends the server 1 the calculated information on the position after the movement in association with the object ID (step S904). Then, the CPU 21 receives, from the server 1, a region ID for identifying a virtual region in which the object exists, the object IDs of the other objects that exist in the same region ID, and the positional information of the individual objects (step S905). The CPU 11 in the server 1 queries the object status information storage unit 131 in the storage unit 13 using the received positional information and object ID as key information to extract and send the region ID, the object IDs of the other objects, which exist in the same region ID, and the positional information of the individual objects.

In the embodiment, information about a virtual region in which an object exists and information about the other objects that exist in the same region are centrally stored in server 1. Alternatively, when an object is moved to one virtual region, information about the virtual region may be downloaded from server 1 and stored in each of the client control units 2.

The CPU 21 selects a predetermined object out of the received other objects (step S906) and calculates the distance between the first object, the specification of which has been accepted, and the selected object on the basis of the positional information of the selected object and the read positional information (step S907). The CPU 21 determines whether the calculated distance is less than a predetermined threshold S (step S908). When the CPU 21 determines that the distance is less than the predetermined threshold S (step S908: YES), the CPU 21 increments a counter by one (step S909) and then determines whether all the received other objects have been selected (step S910). When the CPU 21 determines that the distance is equal to or more than the predetermined threshold S (step S908: NO), the CPU 21 skips step S909.

When the CPU 21 determines that all the received other objects have not been selected (step S910: NO), the CPU 21 returns the process to step S906 and repeats the aforementioned steps. When the CPU 21 determines that all the received other objects have been selected (step S910: YES), the CPU 21 determines whether the accumulated value of the counter exceeds a predetermined value (step S911). When the CPU 21 determines that the accumulated value of the counter is equal to or less than the predetermined value (step S911: NO), the CPU 21 determines that collision determination is not necessary and completes the process. When the CPU 21 determines that the accumulated value of the counter exceeds the predetermined value (step S911: YES), the CPU 21 sends information on the counted objects to the server 1 (step S912).

In the embodiment, the distance between objects is calculated as a linear distance on an XY plane in a virtual region, and it is determined whether the distance is large or small. Alternatively, a method may be used, in which objects that fall within a predetermined range of difference are selected on the basis of only the X coordinates, and then objects that fall within a predetermined range of difference are determined on the basis of only the Y coordinates.

In an embodiment of the invention, the movement position obtaining means corresponds to processing in steps S901 and S902 in the CPU 21, the object detecting means corresponds to processing in steps S903 to S905 in the CPU 21, the distance calculating means corresponds to processing in step S907 in the CPU 21, the distance determining unit corresponds to processing in step S908 in the CPU 21, the neighboring-object-number calculating means corresponds to processing in step S909 in the CPU 21, the determining means corresponds to processing in step S911 in the CPU 21, and the object information sending means corresponds to processing in step S912 in the CPU 21. Moreover, the object information receiving means corresponds to processing in step S1001 in the CPU 11, and the assigning means corresponds to processing in step S1003 in the CPU 11. Moreover, the load value obtaining means corresponds to processing in step S1201 in the CPU 11.

Figure 10:
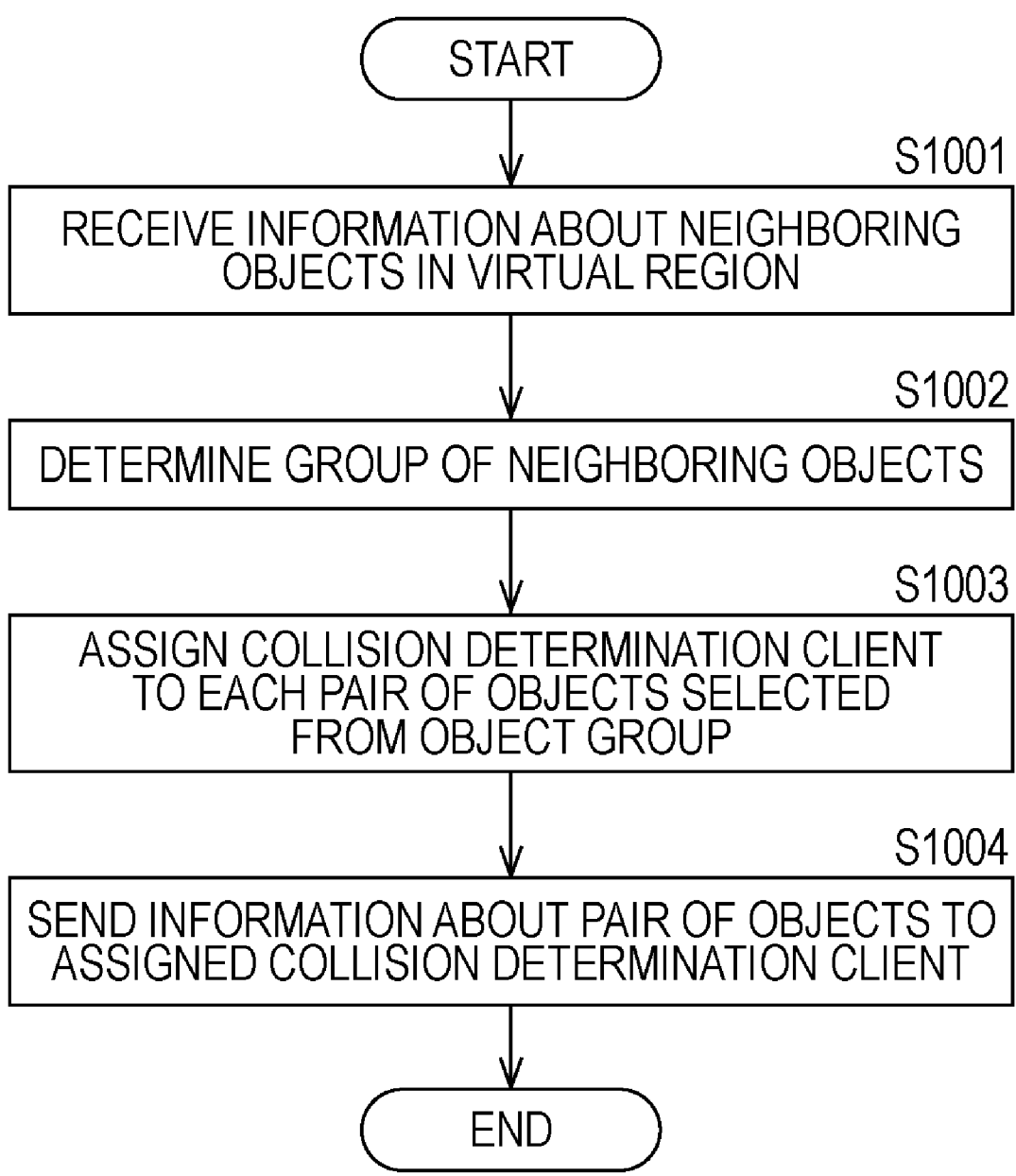
FIG. 10 is a flowchart showing the procedure for assignment by a CPU in the server in the object movement control system according to the embodiment of the present invention.

FIG. 10 is a flowchart showing the procedure for assignment by the CPU 11 in the server 1 in the object movement control system according to the embodiment of the present invention. In FIG. 10, the CPU 11 in the server 1 receives, from the individual client control units 2, information about objects that exist in a virtual region and are close to each other (step S1001). The CPU 11 determines a group of neighboring objects on the basis of the information about neighboring objects, which has been received from the client control units 2 (step S1002).

In a state in which the information about neighboring objects that exist in a virtual region is received, only information on a combination of objects the distance to which is short with respect to the first object is obtained. In this case, since each of the client control units 2 makes determination using only information on whether the distance from each object falls within a predetermine range, in neighboring objects, both pieces of information about neighboring objects received from two of the client control units 2 include the same objects. Thus, they need to be organized to determine a group of neighboring objects.

Figure 11:
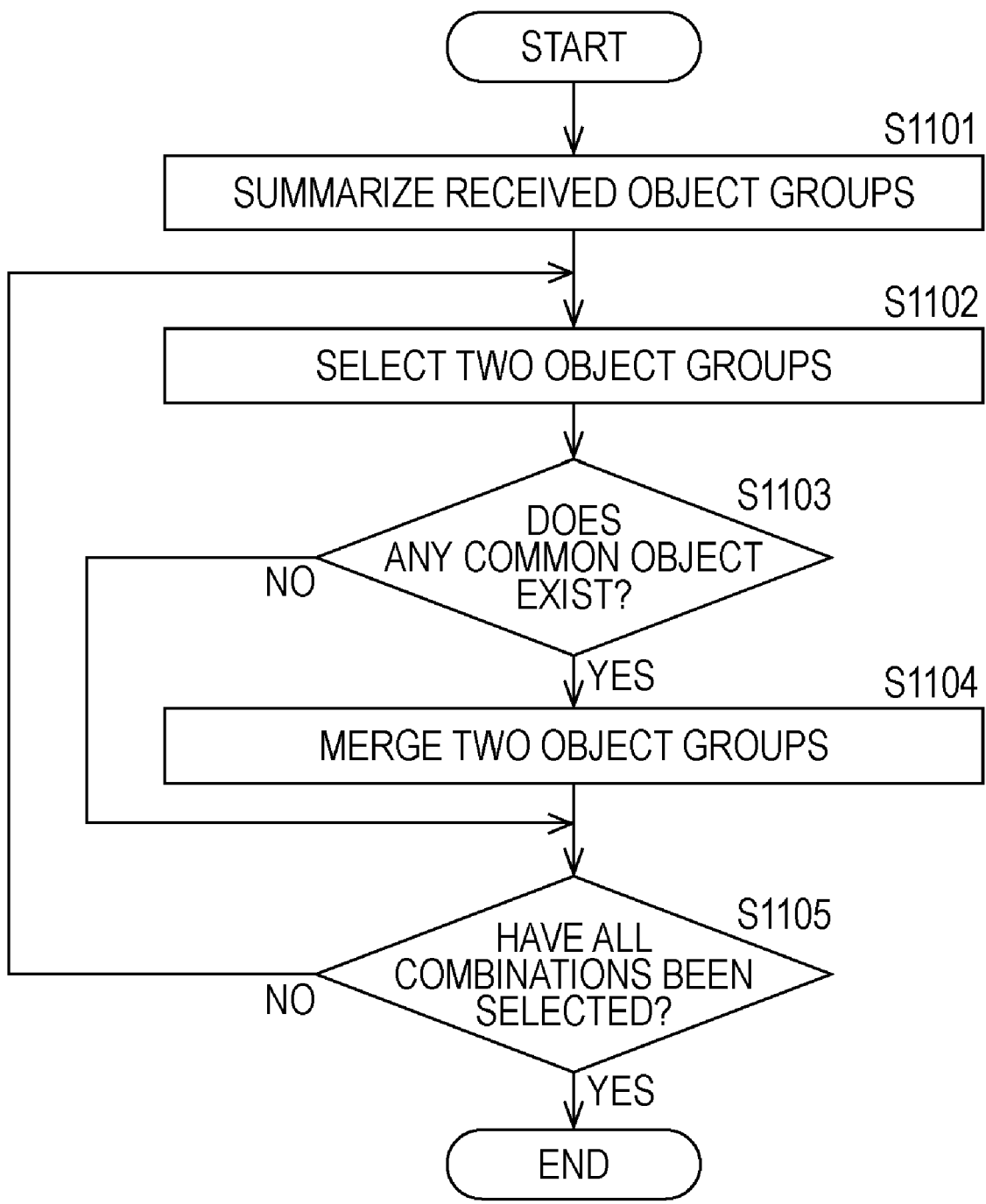
FIG. 11 is a flowchart showing the procedure for determination of a group of neighboring objects by the CPU in the server in the object movement control system according to the embodiment of the present invention.

FIG. 11 is a flowchart showing the procedure for determination of a group of neighboring objects by the CPU 11 in the server 1 in the object movement control system according to the embodiment of the present invention. In FIG. 11, the CPU 11 in the server 1 summarizes object groups received from the individual client control units 2 (step S1101) and then selects two object groups from the received object groups (step S1102).

The CPU 11 determines whether any common object exists in the two object groups (step S1103). When the CPU 11 determines that any common object exists (step S1103: YES), the CPU 11 merges the two object groups (step S1104). In this case, the word "merge" represents processing in which, for example, when one object group A includes objects A1, A2, and A3, and the other object group B includes objects A3, A4, and A5, a single object group that includes the objects A1, A2, A3, A4, and A5 is created.

When the CPU 11 determines that no common object exists (step S1103: NO), the CPU 11 skips step S1104 and determines whether all the combinations have been selected (step S1105). When the CPU 11 determines that all the combinations have been selected (step S1105: YES), the CPU 11 completes the process. When the CPU 11 determines that any combination that has not been selected exists (step S1105: NO), the CPU 11 returns the process to step S1102 and repeats the aforementioned steps.

Returning to FIG. 10, the CPU 11 in the server 1 assigns one of the collision determination clients 3 that performs collision determination to each pair of objects selected from a determined object group (step S1003). The CPU 11 sends, to each of the collision determination clients 3, which has been assigned, information about a corresponding pair of objects (step S1004). When an object group includes n objects, the number of pairs of objects to which the collision determination clients 3 need to be assigned is $_nC_2$.

In a case where a predetermined number or more of objects the distances between which are smaller than a predetermined distance are grouped, as described above, regarding the first object, a range in which the object can be moved without collision with another object is significantly narrower than that in a case where as many objects as the predetermined number are not grouped. Thus, it can be determined that the probability that the object collides with another object is high.

The collision determination clients 3 independent of the client control units 2 are caused to perform determination of collision between objects, so that collision determination that causes heavy processing loads can be performed by computers separate from the client control units 2. Thus, processing loads on the client control units 2 can be reduced. Accordingly, the throughput can be improved as a whole.

When one of the collision determination clients 3 to be assigned is selected, one of the collision determination clients 3 processing loads on which are small is preferably assigned first. This is because, when processing loads on the collision determination clients 3 are substantially even, none of the collision determination clients 3 causes a bottleneck, and thus a decrease in the overall throughput can be forestalled.

For example, a value that indicates a normalized load among different clients, a system load value managed by an operating system, the number of processes, or the combination of these values is used as an index value for determining whether processing loads are heavy or not. Processing in which the number of operating processes is used as an index value for determining whether processing loads are heavy or not will be described below.

Figure 12:
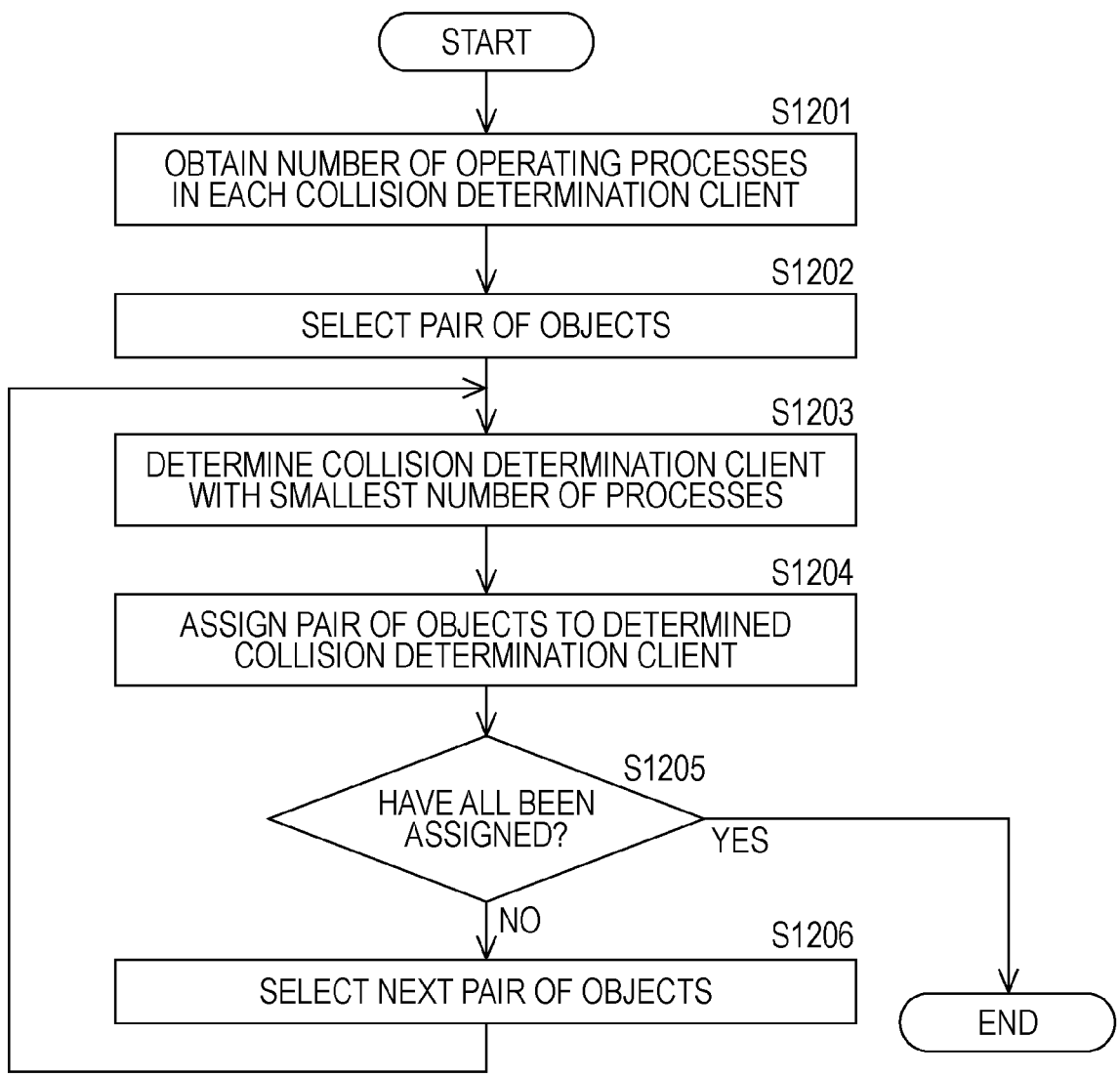
FIG. 12 is a flowchart showing the detailed procedure for assignment by the CPU in the server in the object movement control system according to the embodiment of the present invention.

FIG. 12 is a flowchart showing the detailed procedure for assignment by the CPU 11 in the server 1 in the object movement control system according to the embodiment of the present invention. In FIG. 12, the CPU 11 in the server 1 obtains the number of operating processes in each of all the collision determination clients 3 connected to the server 1 for each of the collision determination clients 3 (step S1201). Then, the CPU 11 selects a predetermined pair of objects from as many pairs of objects as $_nC_2$ to which the collision determination clients 3 are assigned (step S1202).

The CPU 11 determines one of the collision determination clients 3 (step S1203). The number of processes obtained from the one of the collision determination clients 3 is smallest. Then, the CPU 11 assigns the pair of objects to the determined one of the collision determination clients 3 (step S1204). The CPU 11 determines whether all the pairs of objects have been assigned (step S1205). When the CPU 11 determines that any pair of objects that has not been assigned exists (step S1205: NO), the CPU 11 selects the next pair of objects (step S1206), returns the process to step S1203, and repeats the aforementioned steps. When the CPU 11 determines that all the pairs of objects have been assigned (step S1205: YES), the CPU 11 completes the process.

Processing loads on the collision determination clients 3 can be controlled so as to be substantially even by, in the aforementioned manner, preferentially assigning a pair of objects to one of the collision determination clients 3 the number of processes in which is smallest when one of the collision determination clients 3 subjected to assignment is determined. In this case, the method is not limited to a method in which determination of processing loads is performed using the number of processes, and needless to say, another index such as the number of tasks may be used.

Figure 13:
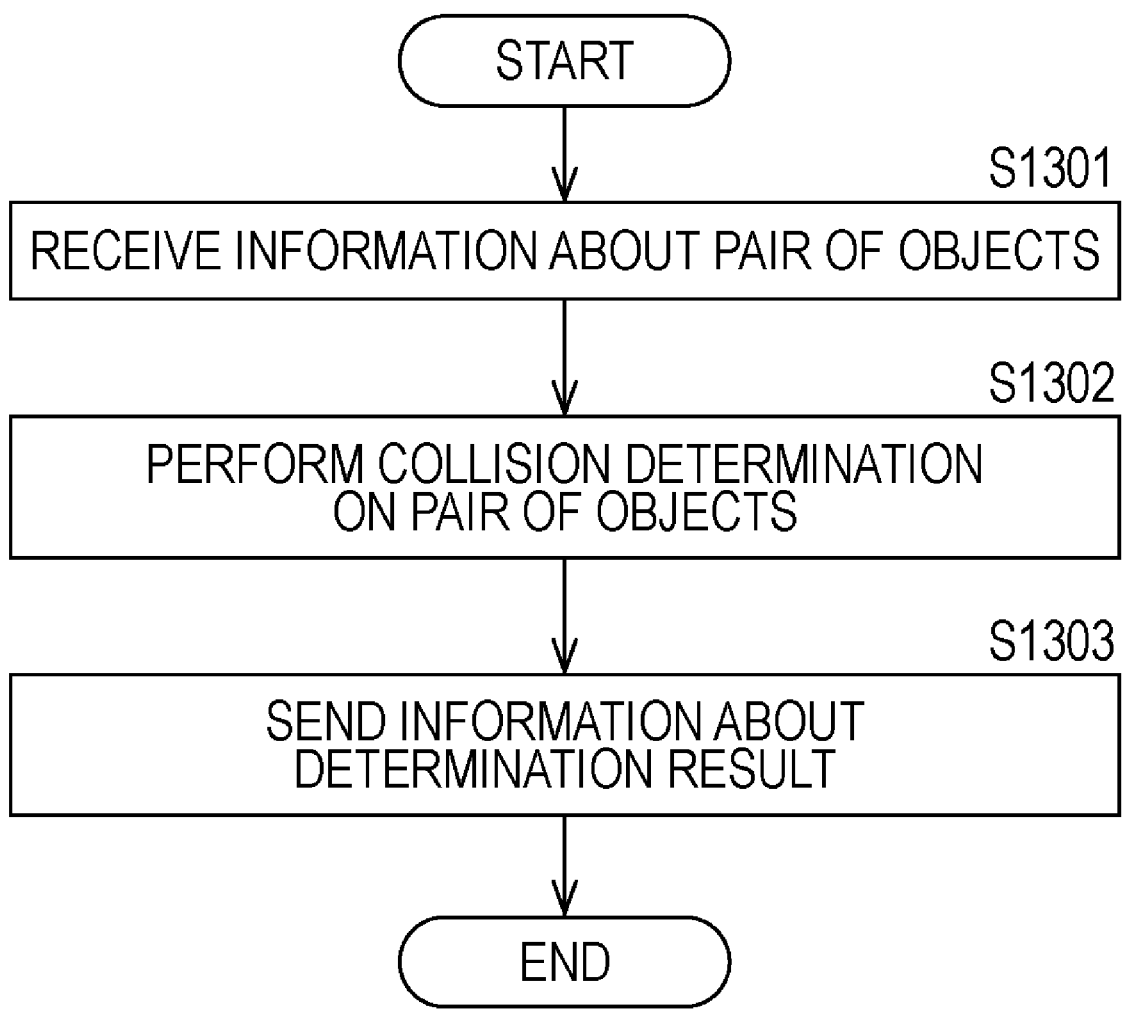
FIG. 13 is a flowchart showing the procedure for collision determination by the CPU in one of the collision determination clients in the object movement control system according to the embodiment of the present invention.

FIG. 13 is a flowchart showing the procedure for collision determination by the CPU 31 in a corresponding one of the collision determination clients 3 in the object movement control system according to the embodiment of the present invention. In FIG. 13, the CPU 31 in the corresponding one of the collision determination clients 3 receives information about a pair of objects from the server 1 (step S1301) and determines whether the objects in the received pair collide with each other (step S1302).

The one of the collision determination clients 3 obtains the polygon data of each of the objects in the pair so as to accurately perform collision determination. Then, it is determined whether interference between the pieces of polygon data occurs in a three-dimensional space. When interference occurs, it is determined that collision occurs. The method for detecting interference between pieces of polygon data is not limited to a specific method, and any known method may be used.

Moreover, in order to reduce processing loads on the collision determination clients 3 as much as possible, after, in the client control units 2, pairs of objects are further narrowed down using a second threshold that is smaller than a distance threshold that is used to determine whether objects are close to each other, only for pairs of objects in which the probability of interference is high, it may be determined whether interference between pieces of polygon data occurs in a three-dimensional space. In this manner, the number of times detection of three-dimensional interference between pieces of polygon data is performed can be reduced. The detection causes heavy processing loads. Thus, processing loads can be reduced as a whole.

FIG. 14 illustrates the relationship between the positions of objects in a case where objects are pieces of three-dimensional polygon data that have a human shape. As shown in FIGS. 14(a) and (b), even in a case where the distance between an object O1 and an object O2 is constant (Δd), when the objects are arranged widthwise, the objects do not collide with each other, as shown in FIG. 14(a); and when the objects are arranged lengthwise, a three-dimensional interference area C occurs, as shown in FIG. 14(b). In this case, the smaller Δd, the higher the probability that the three-dimensional interference area C occurs. Thus, the probability that the objects collide with each other is high.

In this case for example, a threshold distance, of about one meter and fifty centimeters, with which it can be determined whether the objects are close to each other regardless of the orientation of objects is adopted as a first threshold for checking that objects are concentrated in the same virtual region. When a distance, for example, of about fifty centimeters, in which objects are likely to collide with each other depending on the orientation of the objects is adopted as a second threshold, two-stage processing in which it is roughly determined using the first threshold only whether objects are concentrated, and then combinations of objects that are likely to collide with each other are extracted using the second threshold can be adopted. In this manner, overall processing loads can be reduced by performing collision determination that uses polygon data and causes heavy processing loads only between objects for which collision determination is really necessary.

Returning to FIG. 13, the CPU 31 sends information about the result of the determination of collision to the server 1 (step S1303). The information about the result of the determination to be sent includes identification information for identifying the pair of objects, which has been subjected to collision determination, and information that indicates whether collision occurs.

Figure 15:
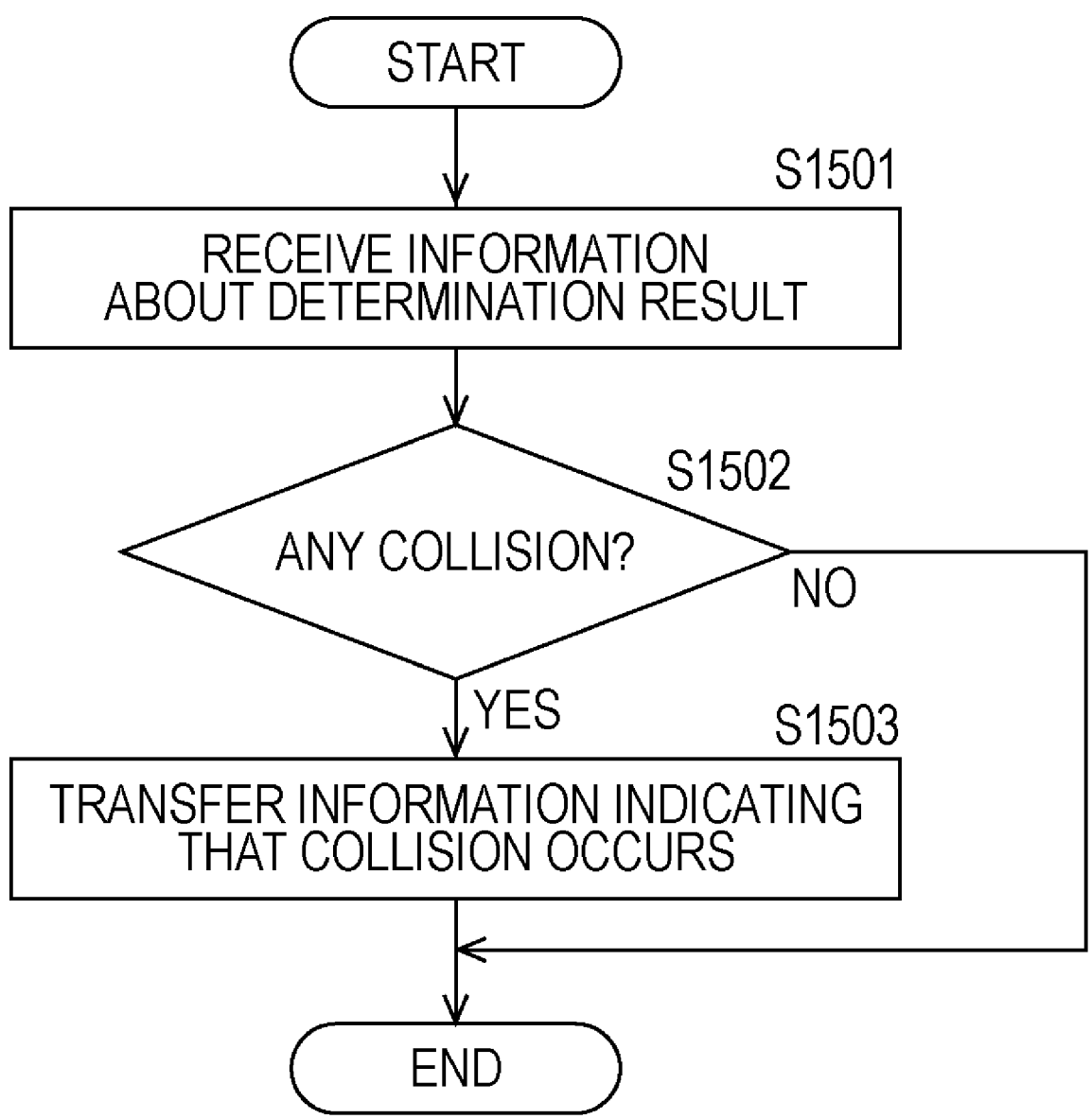
FIG. 15 is a flowchart showing the procedure for transfer of the result of collision determination by the CPU in the server in the object movement control system according to the embodiment of the present invention.

FIG. 15 is a flowchart showing the procedure for transfer of the result of collision determination by the CPU 11 in the server 1 in the object movement control system according to the embodiment of the present invention. In FIG. 15, the CPU 11 in the server 1 receives information about the result of collision determination from a corresponding one of the collision determination clients 3 (step S1501) and determines whether the received information about the determination result indicates that collision occurs (step S1502).

When the CPU 11 determines that the received information about the determination result indicates that collision occurs (step S1502: YES), the CPU 11 transfers information that indicates that collision occurs to one or more of the client control units 2 that control the movement position of the corresponding pair of objects (step S1503). When the CPU 11 determines that the received information about the determination result indicates that collision does not occur (step S1502: NO), the CPU 11 determines that collision does not occur, i.e., movement can be performed, and completes the process.

Figure 16:
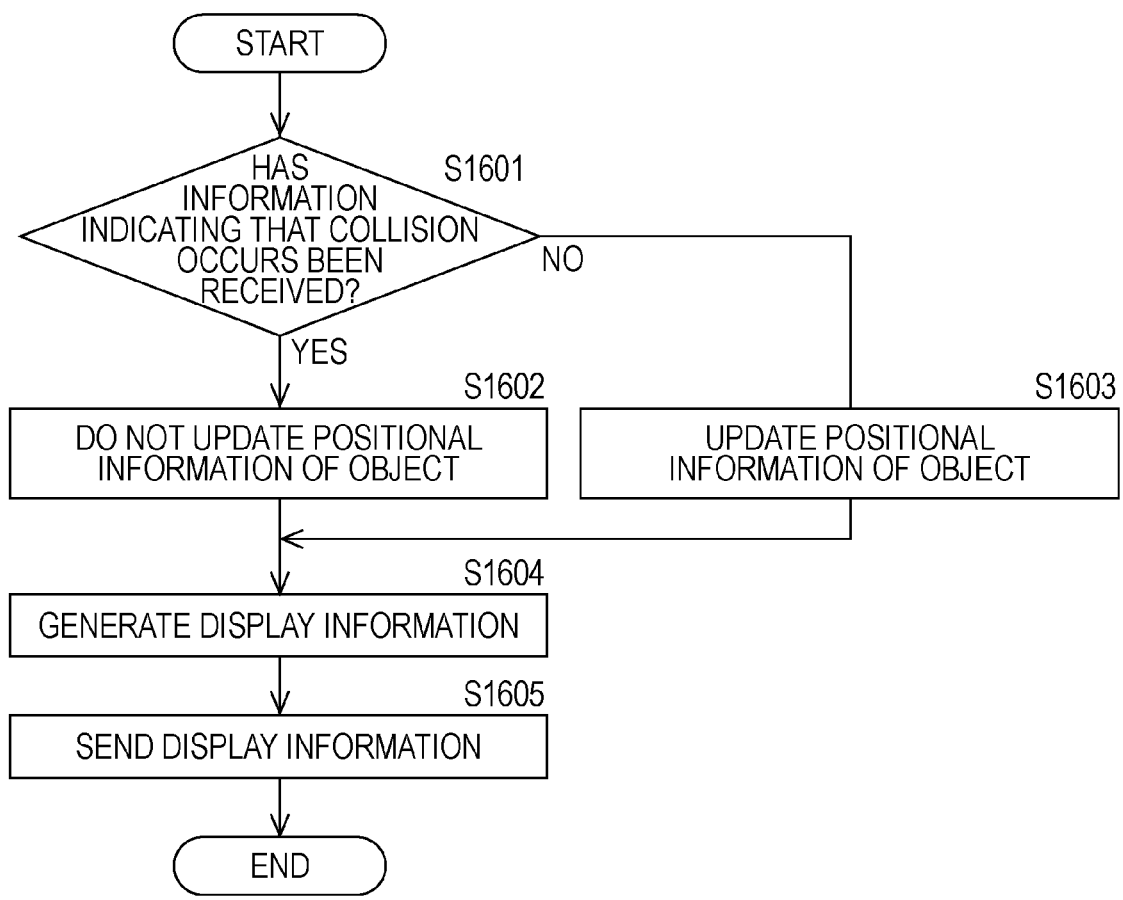
FIG. 16 is a flowchart showing the procedure for update of a position by the CPU in one of the client control units in the object movement control system according to the embodiment of the present invention.

FIG. 16 is a flowchart showing the procedure for update of a position by the CPU 21 in a corresponding one of the client control units 2 in the object movement control system according to the embodiment of the present invention. In FIG. 16, the CPU 21 in the corresponding one of the client control units 2 determines whether information that indicates that collision occurs has been received (step S1601). When the CPU 21 determines that information that indicates that collision occurs has been received (step S1601: YES), the CPU 21 can determine that an object cannot be moved because an obstruction to the movement of the object exists and thus does not update the positional information of the object (step S1602).

When the CPU 21 determines that information that indicates that collision occurs has not been received (step S1601: NO), the CPU 21 can determine that the object can be moved because no obstruction to the movement of the object exists and thus updates the positional information of the object on the basis of the positional information and movement information of the object (step S1603).

The CPU 21 generates display information about an object to be displayed (step S1604) and sends the display information to a corresponding one of the clients 4 (step S1605). The display information includes the background information and information about the shape, position, and the like of the object.

FIG. 17 is a flowchart showing the procedure for displaying an object by the CPU 41 in a corresponding one of the clients 4 in the object movement control system according to the embodiment of the present invention. The CPU 41 in the corresponding one of the clients 4 receives background information and information about the shape, position, and the like of an object as display information (step S1701) and displays a three-dimensional image related to a predetermined object on the display unit 45 on the basis of the received display information (step S1702).

For example, when an object is an avatar in a virtual space, a user performs operation to move the avatar using one of the clients 4. The one of the clients 4, which has accepted the operation, sends information accompanying the operation to one of the client control units 2 that controls the motion of the operated avatar and performs collision determination only on other avatars, obstructions in the background, and the like that are close to the avatar in a predetermined range.

In the collision determination, processing loads are reduced by using a dedicated processor separate from the one of the client control units 2, which controls the motion of the avatar, to reduce the computing time of the collision determination. When a determination result that indicates that the movement of the avatar operated by the user does not collide with the other avatars, obstructions in the background, and the like has been received, the one of the clients 4 can check display of a three-dimensional image in which the avatar has been moved to a movement position by the operation. When a determination result that indicates that the movement of the avatar operated by the user collides with the other avatars, obstructions in the background, and the like has been received, the one of the clients 4 can send, by emitting, for example, a beep, a notification that the avatar cannot be moved to the movement position by the operation. In this manner, in the embodiment, total computing time can be reduced by reducing processing loads, and thus the responsiveness of display of the motion of an avatar in response to user operation can be improved.

According to the embodiment, only when the total number of objects the distances to which are determined as being shorter than a predetermined threshold exceeds a predetermined number, is it determined that collision between objects is likely to occur, and the separate collision determination clients 3 determine the probability of collision, so that overall processing loads can be reduced, and the throughput of calculation of the movement position of an object in a virtual space can be improved.

Moreover, when an object is moved across virtual regions, in the known method, various types of information exchange are necessary between ones of the client control units 2 that control the virtual regions. In contrast, for each object, the movement across virtual regions is controlled, so that only acquisition of information about objects, other than a certain object, that exist in a virtual region in which the object exists from the server 1 is necessary, and thus network loads can be reduced.

The present invention is not limited to the aforementioned embodiment, and needless to say, various modifications and replacements can be made within the scope of the gist of the present invention.

REFERENCE NUMERALS

1: Server
2: Client control unit
3: Collision determination client
4: Client
11, 21, 31, 41: CPU
12, 22, 32, 42: RAM
13, 23, 33, 43: Storage unit
14, 24, 44: Input unit
15, 25: Output unit
16, 26, 34, 46: Communication unit
17: Portable disk drive
18, 27, 35, 47: Internal bus
45: Display unit
90: Portable recording medium
100, 101, 102, 103: Computer program
131: Object status information storage unit
231: Background information storage unit
232: Object information storage unit

What is claimed is:

1. An object movement control system comprising:
a server for obtaining and storing positions of a plurality of objects in a virtual space that comprises a plurality of virtual regions, and
a plurality of client control units connected to the server so that the client control units can communicate data with the server and control a movement position of a predetermined object for each object,
wherein the positions of the plurality of objects in the plurality of virtual regions are used in determining the movement position, and
wherein the object movement is controlled based on comparing the number of objects in the virtual region to a predetermined number of objects and a predetermined threshold distance between objects in the virtual region.

2. The object movement control system of claim 1, further comprising:
a plurality of collision determination clients that are connected to the server so that the collision determination clients can communicate data with the server and determine collision between predetermined objects in a virtual region.

3. The object movement control system according to claim 1, wherein each of the client control units comprises:
movement position obtaining means for obtaining information about a position of a first object in a virtual space and information about movement of the first object, object detecting means for detecting, on the basis of the obtained information about the position and information about the movement, other objects that exist in a virtual region that contains the first object, which has been moved,
distance calculating means for calculating distances between the first object and the detected other objects,
distance determining unit for determining whether the calculated distances are smaller than a predetermined threshold,
neighboring-object-number calculating means for calculating the total number of objects distances to which are determined as being shorter than the predetermined threshold by the distance determining unit,
determining means for determining whether the calculated total number of objects exceeds a predetermined number, and
object information sending means for sending, to the server, information about the objects, which exist in the virtual region, when the determining means determines that the calculated total number of objects exceeds the predetermined number.

4. The object movement control system according to claim 1, wherein the server comprises:
object information receiving means for receiving information about the objects which exist in the virtual region, and
assigning means for assigning one of the collision determination clients that performs collision determination to each pair of objects selected from the received objects.

5. The object movement control system according to claim 4, wherein the server further comprises:
load value obtaining means for obtaining an index value that indicates a processing load on each of the collision determination clients, and the assigning means determines one of the collision determination clients to which a pair of objects is assigned on the basis of the obtained index values.

6. The object movement control system according to claim 3, wherein the distance calculating means calculates distances between representative points that indicate positions of respective objects.

7. An object movement control method performed by a server and a plurality of client control units connected to the server, the method comprising:
obtaining and storing positions of a plurality of objects in a virtual space that comprises a plurality of virtual regions;
comparing the number of objects in the virtual region to a predetermined number of objects and a predetermined threshold distance between objects in the virtual region;
determining a movement position based on the positions of the plurality of objects in the plurality of virtual regions; and
controlling a motion of an object that is moved in the virtual space.

8. The object control movement control method of claim 7, wherein each of the client control units:
obtains information about a position of a first object in a virtual space and information about movement of the first object,
detects, on the basis of the obtained information about the position and information about the movement, other objects that exist in a virtual region that contains the first object, which has been moved,
calculates distances between the first object and the detected other objects, determines whether the calculated distances are smaller than a predetermined threshold, calculates the total number of objects distances to which are determined as being shorter than the predetermined threshold, determines whether the calculated total number of objects exceeds a predetermined number, and sends, to the server, information about the objects, which exist in the virtual region, when it is determined that the calculated total number of objects exceeds the predetermined number.

9. The object control movement control method of claim 7, wherein the server:

receives the information about the objects, which exist in the virtual region, and assigns one of the collision determination clients that performs collision determination to each pair of objects selected from the received objects.

10. The object control movement control method of claim 9, wherein the server is connected to a plurality of client control units that control a movement position of a predetermined object for each object and a plurality of collision determination clients that determine collision between predetermined objects in a virtual region so that data communication can be performed and obtains and stores positions of a plurality of objects in a virtual space that comprises a plurality of virtual regions, the server further comprising:

object information receiving means for receiving, from the client control units, information about a plurality of objects that exist in the virtual region, and assigning means for assigning one of the collision determination clients that performs collision determination to each pair of objects selected from the received objects.

11. The object control movement control method of claim 10, wherein the server further comprises:

load value obtaining means for obtaining an index value that indicates a processing load on each of the collision determination clients, wherein the assigning means determines one of the collision determination clients to which a pair of objects is assigned on the basis of the obtained index values.

12. An article of manufacture tangibly embodying a non-transitory computer readable program that can be executed in a server that is connected to a plurality of client control units that control a movement position of a predetermined object for each object and a plurality of collision determination clients that determine collision between predetermined objects in a virtual region, wherein the computer program, when executed, causes the server to carry out a method comprising the steps of:

obtaining and storing positions of a plurality of objects in a virtual space that comprises a plurality of virtual regions comparing the number of objects in the virtual region to a predetermined number of objects and a predetermined threshold distance between objects in the virtual region;

determining a movement position based on the positions of the plurality of objects in the plurality of virtual regions; and controlling a motion of an object that is moved in the virtual space.

13. The article of manufacture as in claim 12, wherein the computer program causes the server to function as:

object information receiving means for receiving, from the client control units, information about a plurality of objects that exist in the virtual region, and assigning means for assigning one of the collision determination clients that performs collision determination to each pair of objects selected from the received objects.

14. The article of manufacture according to claim 13, wherein:

the server is caused to function as load value obtaining means for obtaining an index value that indicates a processing load on each of the collision determination clients, and the assigning means is caused to function as means for determining one of the collision determination clients to which a pair of objects is assigned on the basis of the obtained index values.

* * * * *